US012804646B2

(12) United States Patent
Toyoda et al.

(10) Patent No.: US 12,804,646 B2
(45) Date of Patent: Nov. 17, 2026

(54) COMMUNICATION APPARATUS AND COMMUNICATION METHOD

(71) Applicant: Sony Group Corporation, Tokyo (JP)

(72) Inventors: Naoyuki Toyoda, Tokyo (JP); Masahiko Ikeda, Tokyo (JP); Takuma Takada, Tokyo (JP); Yojiro Shimizu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 225 days.

(21) Appl. No.: 18/849,550

(22) PCT Filed: Mar. 14, 2023

(86) PCT No.: PCT/JP2023/009747
§ 371 (c)(1),
(2) Date: Sep. 23, 2024

(87) PCT Pub. No.: WO2023/189515
PCT Pub. Date: Oct. 5, 2023

(65) Prior Publication Data

US 2025/0212210 A1 Jun. 26, 2025

(30) Foreign Application Priority Data

Mar. 30, 2022 (JP) ................................ 2022-055439

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0003* (2013.01); *H04W 72/0446* (2013.01); *H04W 76/15* (2018.02)

(58) Field of Classification Search
CPC ......... H04W 72/1268; H04W 72/0446; H04W 76/15; H04L 1/0003
See application file for complete search history.

(56) References Cited

U.S. PATENT DOCUMENTS

| | | | |
|---|---|---|---|
| 11,246,178 B2 | 2/2022 | Shikari | |
| 2014/0334442 A1 | 11/2014 | Kanamarlapudi et al. | |
| 2024/0155550 A1* | 5/2024 | Dai | ..................... H04W 64/006 |

FOREIGN PATENT DOCUMENTS

| | | |
|---|---|---|
| JP | 2004-129165 A | 4/2004 |
| JP | 2010-530155 A | 9/2010 |

(Continued)

OTHER PUBLICATIONS

Kim Eunkyung et al, KR 2020/0057647 (A), May 26, 2020, English language translation. (Year: 2020).*

(Continued)

*Primary Examiner* — Melvin C Marcelo
(74) *Attorney, Agent, or Firm* — XSENSUS LLP

(57) ABSTRACT

A communication apparatus in which an aggregate of a plurality of cells is set includes an acquisition unit that acquires, for each cell, delay time information of upstream transmission by the communication apparatus, and a communication control unit that starts the upstream transmission from a cell selected based on the delay time information among the plurality of cells. The acquisition unit acquires information regarding a delay time between application layers of the upstream transmission as the delay time information.

19 Claims, 16 Drawing Sheets

(51) Int. Cl.
*H04W 72/0446* (2023.01)
*H04W 76/15* (2018.01)

(56) References Cited

FOREIGN PATENT DOCUMENTS

| | | | |
|---|---|---|---|
| JP | 2016-516340 | A | 6/2016 |
| JP | 6540828 | B2 | 7/2019 |
| JP | 2021-503194 | A | 2/2021 |
| KR | 10-2020-0057647 | A | 5/2020 |
| WO | 2020/166230 | A1 | 8/2020 |

OTHER PUBLICATIONS

WO2023189515, Written Opinion, Apr. 7, 2023, English language translation. (Year: 2023).*

International Search Report and Written Opinion mailed on Apr. 25, 2023, received for PCT Application PCT/JP2023/009747, filed on Mar. 14, 2023, 12 pages including English Translation.

* cited by examiner

COMMUNICATION APPARATUS AND COMMUNICATION METHOD

CROSS-REFERENCE TO RELATED APPLICATIONS

The present application is a national stage application, pursuant to 35 U.S.C. § 371, of International Patent Application No. PCT/JP2023/009747, filed Mar. 14, 2023, which claims priority from Japanese Patent Application No. 2022-055439, filed Mar. 30, 2022, the entire contents of each are incorporated herein by reference.

FIELD

The present disclosure relates to a communication apparatus and a communication method.

BACKGROUND

Development of cellular wireless communication technologies such as LTE and 5G NR has been active. For example, in recent years, a technology for bundling and using a plurality of radio links has been actively developed in order to increase a communication speed. As an example of the technology for bundling and using the plurality of radio links, a technology called dual connectivity for bundling radio waves of a plurality of cells is known.

CITATION LIST

Patent Literature

Patent Literature 1: JP 6540828 B2

SUMMARY

Technical Problem

When radio waves of a plurality of cells are bundled, a high speed communication is achieved but low delay may not be always achieved. For example, in dual connectivity in a cell with small delay (e.g., 5G NR cell) and a cell with large delay (e.g., LTE cell), packet latency frequently occurs in the cell with large delay when sequence control is performed. In this case, a delay amount increases. In addition, the delay amount may increase depending on a radio wave condition between terminal cells and a use condition of a communication facility.

Therefore, the present disclosure proposes a communication apparatus and a communication method capable of realizing low delay.

Note that the above problem or object is merely one of a plurality of problems or objects that can be solved or achieved by a plurality of embodiments disclosed in the present specification.

Solution to Problem

In order to solve the above problem, communication apparatus in which an aggregate of a plurality of cells is set according to one embodiment of the present disclosure, the communication apparatus includes: an acquisition unit configured to acquire, for each of the plurality of cells, delay time information of upstream transmission by the communication apparatus; and a communication control unit configured to start the upstream transmission from a cell selected, among the plurality of cells, based on the delay time information, wherein the acquisition unit acquires information regarding a delay time between application layers of the upstream transmission as the delay time information.

DESCRIPTION OF EMBODIMENTS

Figure 1:
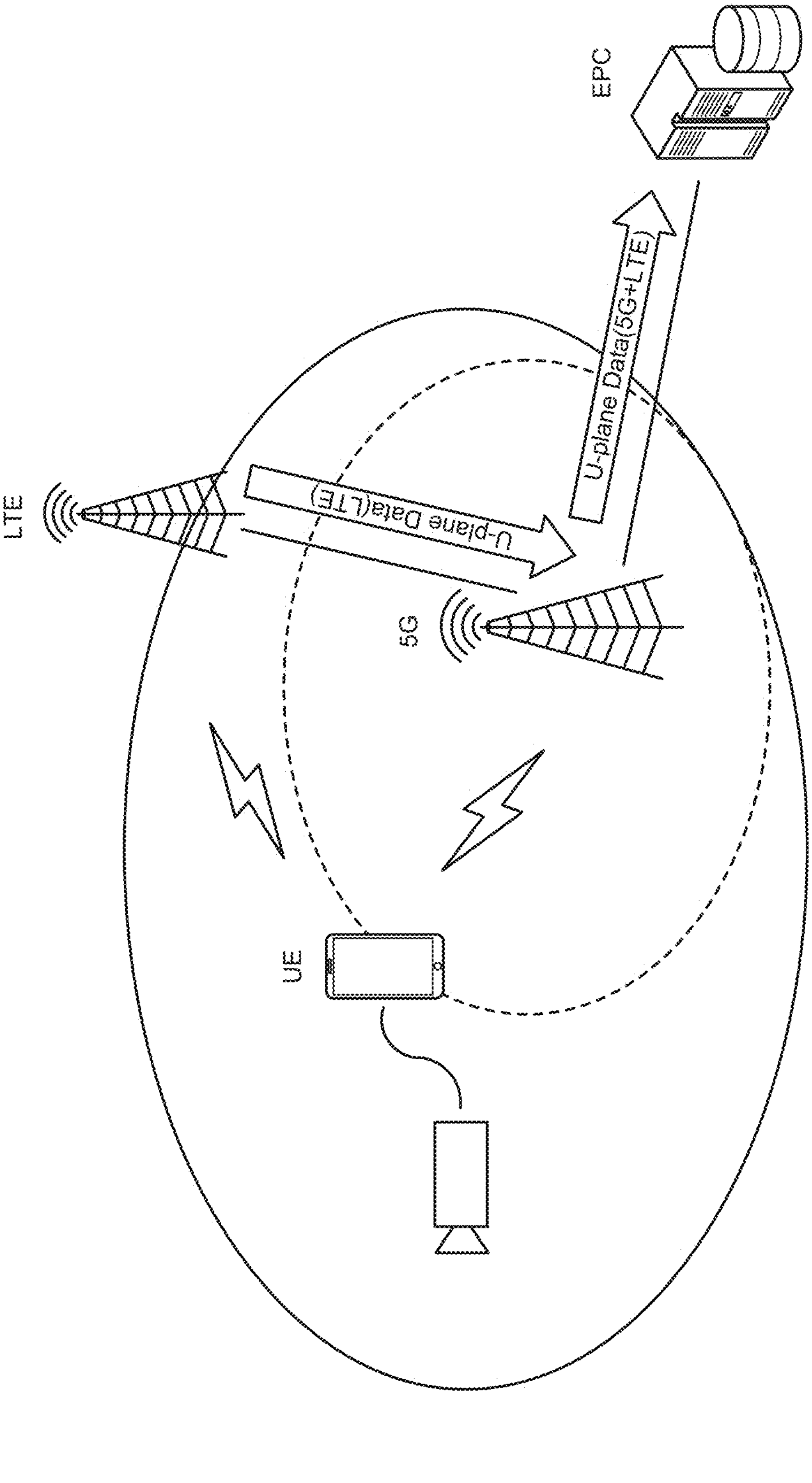
FIG. 1 is a diagram illustrating an example of dual connectivity.

Hereinafter, embodiments of the present disclosure will be described with reference to the drawings. In each of the following embodiments, same parts are given the same reference signs to omit redundant description.

In addition, in the present specification and the drawings, a plurality of components having substantially the same functional configuration may be distinguished by attaching different numerals after the same reference sign. For example, a plurality of configurations having substantially the same functional configuration is distinguished as terminal devices 40$_1$, 40$_2$, and 40$_3$ as necessary. However, when it is not particularly necessary to distinguish each of the plurality of components having substantially the same functional configuration, only the same reference sign is given. For example, in a case where it is not necessary to particularly distinguish the terminal devices 40$_1$, 40$_2$, and 40$_3$, they are simply referred to as terminal devices 40.

In the description below, one or more embodiments (including examples and modifications) can be implemented independently. On the other hand, at least some of the plurality of embodiments described below may be appropriately combined with at least some of other embodiments. The plurality of embodiments may include novel features different from each other. Therefore, the plurality of embodiments can contribute to solving different objects or problems, and can exhibit different effects.

1. Outline

Radio access technology (RAT) such as long term evolution (LTE) and 5G new radio (5G NR) has been studied in the third generation partnership project (3GPP). The LTE and NR are types of cellular communication technology, and enable mobile communication of a terminal device by arranging a plurality of cellular areas covered by a base station. Here, a single base station may manage a plurality of cells.

In the following description, the LTE includes LTE-Advanced (LTE-A), LTE-Advanced Pro (LTE-A Pro), and evolved universal terrestrial radio access (E-UTRA). Still more, the NR (5G NR) includes new radio access technology (NRAT) and further E-UTRA (FE-UTRA). In the following description, a cell corresponding to the LTE is referred to as an LTE cell, and a cell corresponding to the NR is referred to as an NR cell.

The NR (5G NR) is the next generation (fifth generation) radio access technology (RAT) of the LTE. The NR is the radio access technology that can support various use cases including enhanced mobile broadband (eMBB), massive machine type communications (mMTC), and ultra-reliable and low latency communications (URLLC). In the NR, various technologies have been introduced aiming at a technical framework corresponding to use scenarios, requirements, arrangement scenarios, and the like in these use cases. For example, in the NR, in order to handle diversifying communication services, new technologies such as a band width part (BWP) and a network slice have been introduced. Note that, in the following description, the NR (5G NR) may be referred to as 5G.

<1-1. Outline of Problem>

A technology for bundling and using a plurality of radio links is known. For example, as an example of the technology for bundling and using a plurality of radio links, a technology called dual connectivity for bundling radio waves of a plurality of cells is known.

When the radio waves of the plurality of cells are bundled, a large capacity and a high communication speed are realized but a low delay may not be always realized. For example, in the dual connectivity in a cell with small delay (e.g., 5G cell) and a cell with large delay (e.g., LTE cell), packet latency frequently occurs in the cell with large delay when sequence control is performed. In this case, a delay amount increases.

This will be described with reference to the drawings. FIG. 1 is a diagram illustrating an example of the dual connectivity. FIG. 1 illustrates a state in which user equipment (UE) performs upstream communication by E-UTRAN new radio-dual connectivity (EN-DC) using the 5G cell (also referred to as the NR cell) and the LTE cell.

For example, in a broadcast use case, when up link (UL) real-time video streaming is performed in the EN-DC, data flows not only in the 5G cell but also in the LTE cell depending on an EN-DC configuration. In an example in FIG. 1, data received at an LTE base station is transferred to a 5G base station. In the 5G base station, the sequence control of data received by the 5G base station and data received by the LTE base station is performed.

Figure 2:
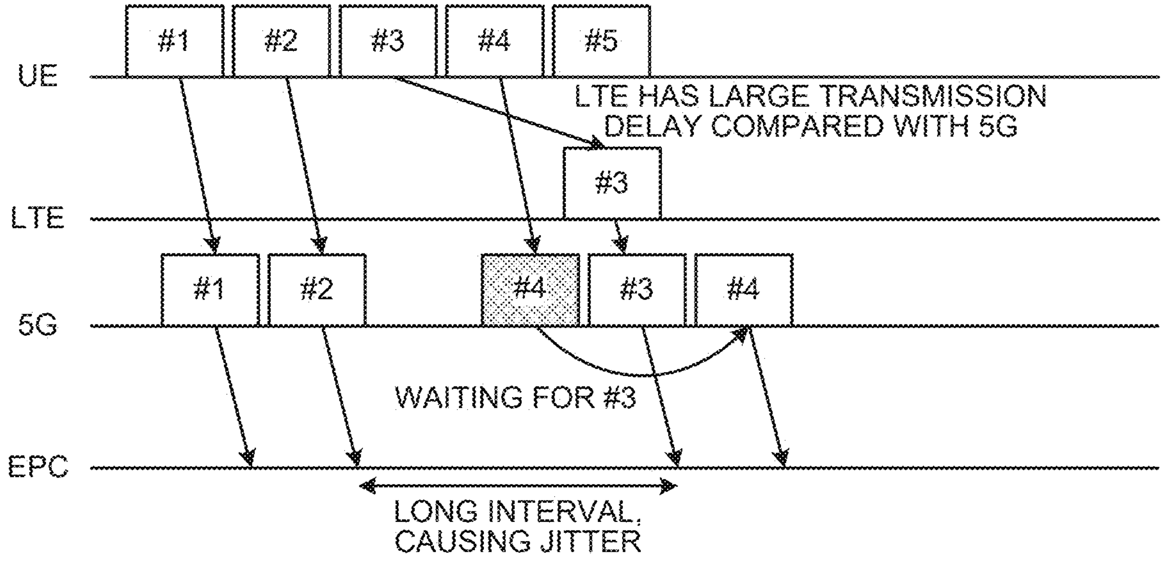
FIG. 2 is a diagram illustrating sequence control in a base station.

FIG. 2 is a diagram illustrating the sequence control in the base station. Compared with the 5G, the LTE has a large transmission delay. Therefore, when data is transferred from the LTE base station to the 5G base station, transmission of data already received by the 5G base station may subject to transmission latency until data on the LTE side is transferred. In an example in FIG. 2, packets #1, #2, and #4 are directly transmitted from the UE to the 5G base station, and a packet #3 is transmitted from the UE to the 5G base station via the LTE base station. At this time, the 5G base station has not yet received the packet #3 when the packet #4 is received. Therefore, the packet #4 is subjected to transmission latency until the packet #3 is transferred from the LTE base station. Here, a delay occurs. When streaming is always performed in the 5G and the LTE, delay time increases on average. When streaming is performed frequently in the LTE, it appears as jitter as illustrated in FIG. 2.

<1-2. Outline of Solution>

Therefore, the present embodiment solves this problem as follows.

In a communication apparatus (e.g., UE in FIG. 1) of the present embodiment, an aggregate of a plurality of cells is set. For example, as illustrated in FIG. 1, the communication apparatus of the present embodiment is configured to perform upstream communication by dual connectivity using a cell with a small delay amount (e.g., 5G cell) and a cell with a large delay amount (e.g., LTE cell).

The communication apparatus according to the present embodiment acquires information related to delay time of upstream transmission for each cell. For example, the communication apparatus acquires information calculated based on the delay time between application layers of the upstream transmission as delay time information. For example, the communication apparatus acquires an evaluation value calculated based on information on a transmission delay time of a transmission packet between a host application installed in a transmission device and a host application installed in a reception device. At this time, the delay time information may be transmitted from the application layer to a PDCP layer of the communication apparatus. Then, the communication apparatus starts the upstream transmission from a cell selected, among the plurality of cells, based on the delay time information. For example, the PDCP layer of the communication apparatus starts the upstream transmission from a cell in which the delay time of the upstream transmission is evaluated to be small based on the delay time information.

As a result, the communication apparatus according to the present exemplary embodiment can achieve low delay even when radio waves from a plurality of cells are bundled to perform communication.

Figure 3:
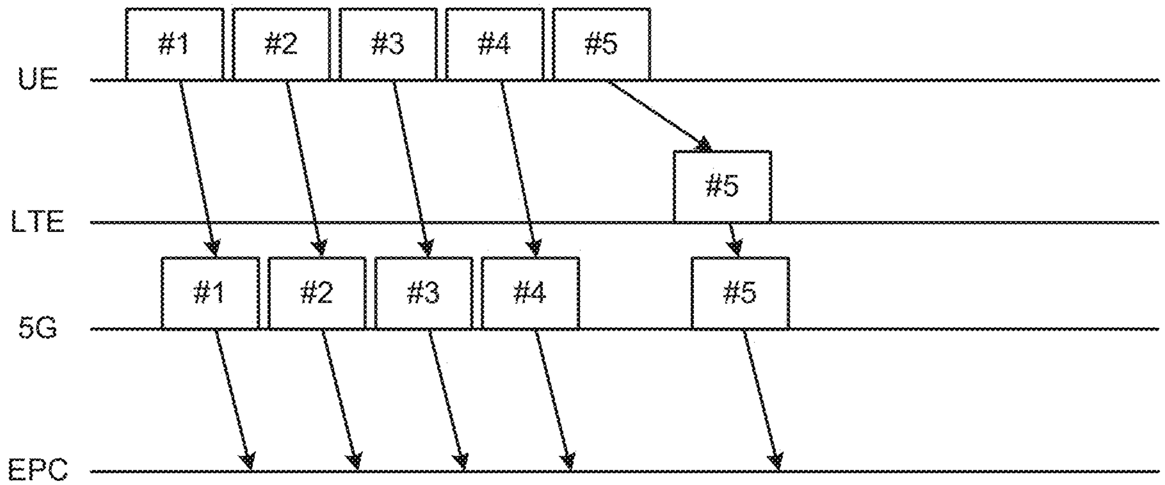
FIG. 3 is a diagram illustrating a result of packet transmission control using a communication method according to the present embodiment.

FIG. 3 is a diagram illustrating a result of packet transmission control using the communication method according to the present embodiment. In the example in FIG. 3, unlike the example in FIG. 2, the communication apparatus (UE) first transmits the packets #1, #2, #3, and #4 in the cell (5G cell) with a small delay amount, and then transmits the packet #5 in the cell (5G cell) with a large delay amount. Therefore, in the example in FIG. 3, at least up to the transfer of the packet #4, the delay is lower than that in the example in FIG. 2. In the example in FIG. 3, only the packet #5 is delayed. By repeating the transmission control using the communication method of the present embodiment, for example, an average delay amount becomes lower than that in the conventional method.

The outline of the present embodiment has been described above, and a communication system according to the present embodiment will be described in detail below.

2. Configuration of Communication System

Hereinafter, a configuration of a communication system 1 will be specifically described with reference to the drawings.

<2-1. Configuration Example of Communication System>

Figure 4:
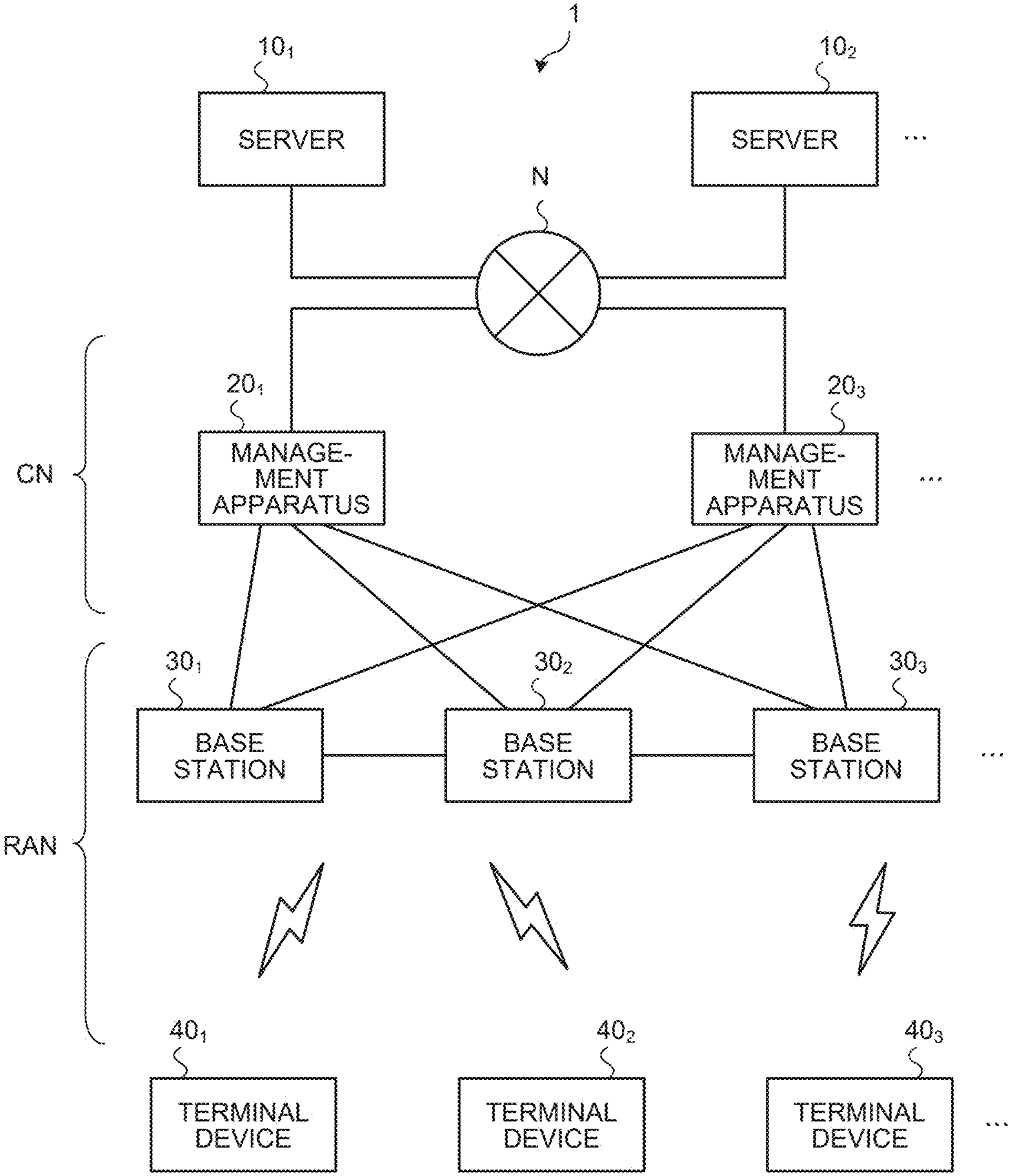
FIG. 4 is a diagram illustrating a configuration example of a communication system according to an embodiment of the present disclosure.

FIG. 4 is a diagram illustrating a configuration example of the communication system 1 according to the embodiment of the present disclosure. The communication system 1 includes a server 10, a management apparatus 20, a base station 30, and a terminal device 40. The communication system 1 provides a user with a wireless network capable of mobile communication by coordinated operation of devices configuring the communication system 1. The wireless network of the present embodiment includes, for example, a radio access network and a core network. Note that, in the present embodiment, the wireless communication apparatus is an apparatus having a function of wireless communication, and corresponds to the base station 30 and the terminal device 40 in the example in FIG. 4.

The communication system 1 may include a plurality of servers 10, a plurality of management apparatuses 20, a plurality of base stations 30, and a plurality of terminal devices 40. In the example in FIG. 4, the communication system 1 includes servers $\mathbf{10}_1$, $\mathbf{10}_2$, and so on as the server 10, management apparatuses $\mathbf{20}_1$, $\mathbf{20}_2$, and so on as the management apparatus 20, and base stations $\mathbf{30}_1$, $\mathbf{30}_2$, and so on as the base station 30. Furthermore, the communication system 1 includes terminal devices $\mathbf{40}_1$, $\mathbf{40}_2$, $\mathbf{40}_3$, and so on as the terminal device 40.

Captured data transmitted to the management apparatus 20 is transmitted to the server 10 via a network N. The network N is a communication network such as a local area network (LAN), a wide area network (WAN), a telephone network (mobile telephone network, fixed telephone network, etc.), a regional Internet protocol (IP) network, or the Internet. The network N may include a wired network or a wireless network. In addition, the network N may include a core network.

Although only one network N is illustrated in the example in FIG. 4, different data networks may exist for each core network. The data network may also be a service network of a telecommunications carrier such as an IP multimedia subsystem (IMS) network. Furthermore, the data network may be a private network such as an intra-company network.

Note that devices in the drawings may be considered as devices in a logical sense. In other words, a part of the devices in the drawing may be realized by a virtual machine (VM), a container, a docker, or the like, and they may be implemented on physically the same hardware.

Note that the communication system 1 may support the radio access technology (RAT) such as long term evolution (LTE) or new radio (NR). The LTE and NR are types of cellular communication technology, and enable mobile communication of a terminal device by arranging a plurality of cellular areas covered by a base station. One base station may manage a plurality of cells. Furthermore, the communication system 1 may be a broadband mobile radio access system (BWA) or a digital cordless telephone system.

In the following description, the "LTE" includes LTE-Advanced (LTE-A), LTE-Advanced Pro (LTE-A Pro), and evolved universal terrestrial radio access (E-UTRA). Still more, the NR includes new radio access technology (NRAT) and further E-UTRA (FE-UTRA). In addition, the "LTE" and "NR" include radio access technologies standardized by the WiMAX forum or the XGP forum, using these as reference standards. In the following description, a cell corresponding to the LTE is referred to as an LTE cell, and a cell corresponding to the NR is referred to as an NR cell.

The NR is the next generation (fifth generation) radio access technology (RAT) of the LTE. The NR is the radio access technology that can support various use cases including enhanced mobile broadband (eMBB), massive machine type communications (mMTC), and ultra-reliable and low latency communications (URLLC). The NR has been studied aiming at a technical framework corresponding to use scenarios, requirements, arrangement scenarios, and the like in these use cases.

The radio access scheme used by the communication system 1 is not limited to the LTE and the NR, and may be a radio access technology standardized by 3GPP such as a wideband code division multiple access (W-CDMA), a radio access technology standardized by 3GPP2 such as code division multiple access 2000 (cdma2000), or another radio access scheme using a radio access technology standardized by WiMAX forum, XGP forum, IEEE802.16 Committee, or the like. Furthermore, the communication system 1 may support a low power wide area (LPWA) communication.

Here, the LPWA communication is the wireless communication that enables low-power wide-area communication. For example, the LPWA radio is Internet of Things (IoT) wireless communication using a specified low power radio (e.g., 920 MHz band) or an industry-science-medical (ISM) band. The LPWA communication used by the communication system 1 may conform to the LPWA standards. Examples of the LPWA standards include ELTRES, ZETA, SIGFOX, LoRaWAN, and NB-Iot. It is apparent that the LPWA standards are not limited thereto, and may be other LPWA standards.

Furthermore, the base station configuring the communication system 1 may be a ground station or a non-ground station. The non-ground station may be a satellite station or an aircraft station. When the non-ground station is the satellite station, the communication system 1 may be a bent-pipe (transparent) type mobile satellite communication system.

In the present embodiment, the ground station (also referred to as a ground base station) refers to a base station (including a relay station) installed on the ground. Here, the "ground" is a ground in a broad sense including not only land but also underground, water, and underwater. Note that, in the following description, the "ground station" may be replaced with a "gateway".

Note that an LTE base station may be referred to as an evolved node B (eNodeB) or an eNB. Further, an NR base station may be referred to as a gNodeB or a gNB. In the LTE and NR, the terminal device (also referred to as a mobile station or a terminal) may be referred to as user equipment (UE). Note that the terminal device is a type of communication apparatus, and is also referred to as a mobile station or a terminal.

In the present embodiment, the concept of the communication apparatus includes not only a portable mobile device (terminal device) such as a mobile terminal but also a device installed in a structure or a mobile body. The structure or the mobile body itself may be regarded as the communication apparatus. In addition, the concept of the communication apparatus also includes the base station and the relay station in addition to the terminal device. The communication apparatus is one type of processor and information processor. Furthermore, the communication apparatus can be rephrased as a transmission device or a reception device.

Hereinafter, a configuration of each device configuring the communication system 1 will be specifically described. Note that the configuration of each device described below is merely an example. The configuration of each device may be different from the following configuration.

<2-2. Configuration Example of Server>

First, a configuration of the server 10 will be described.

The server 10 is an information processing apparatus (computer) that executes various types of processing based on a request from the communication apparatus such as the terminal device 40. The server 10 may be a PC server, a midrange server, or a mainframe server.

Figure 5:
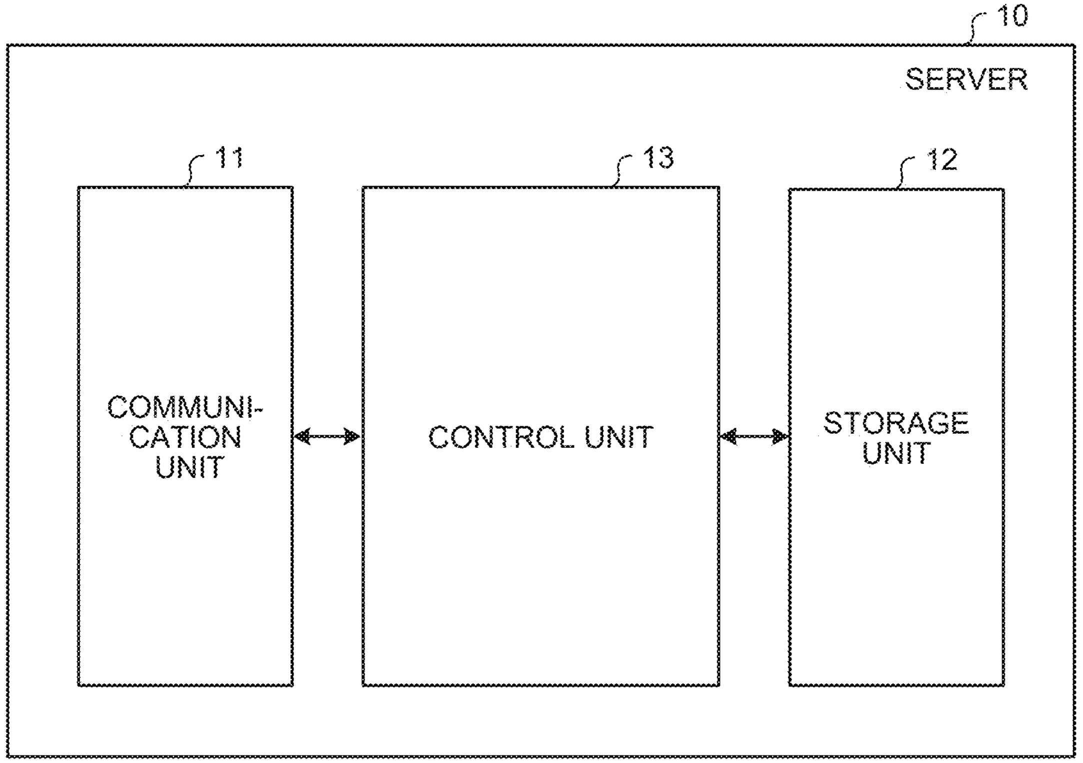
FIG. 5 is a diagram illustrating a configuration example of a server according to the embodiment of the present disclosure.

FIG. 5 is a diagram illustrating a configuration example of the server 10 according to the embodiment of the present disclosure. The server 10 includes a communication unit 11, a storage unit 12, and a control unit 13. Note that the configuration illustrated in FIG. 5 is a functional configuration, and a hardware configuration may be different from the functional configuration. Furthermore, functions of the server 10 may be implemented in a distributed manner in a plurality of physically separated configurations. For example, the server 10 may include a plurality of server devices.

The communication unit 11 is a communication interface for communicating with other devices. The communication unit 11 may be a network interface or a device connection interface. For example, the communication unit 11 may be a local area network (LAN) interface such as a network interface card (NIC), or may be a universal serial bus (USB) interface including a USB host controller and a USB port. Furthermore, the communication unit 11 may be a wired interface or a wireless interface. The communication unit 11 functions as a communication means of the server 10. The communication unit 11 communicates with the terminal device 40 according to the control of the control unit 13.

The storage unit 12 is a data readable/writable storage device such as a dynamic random access memory (DRAM), a static random access memory (SRAM), a flash memory, or a hard disk. The storage unit 12 functions as a storage means of the server 10. The storage unit 12 stores, for example, captured data (e.g., image data or metadata) transmitted from the terminal device 40 via the base station 30.

The control unit 13 is a controller that controls each unit of the server 10. The control unit 13 is realized by, for example, a processor such as a central processing unit (CPU) or a micro processing unit (MPU). For example, the control unit 13 is implemented by a processor executing various programs stored in a storage device inside the server 10 using a random access memory (RAM) or the like as a work area. Note that the control unit 13 may be realized by an integrated circuit such as an application specific integrated circuit (ASIC) or a field programmable gate array (FPGA). Any of the CPU, the MPU, the ASIC, and the FPGA can be regarded as the controller.

<2-3. Configuration Example of Management Apparatus>

Next, a configuration of the management apparatus 20 will be described.

The management apparatus 20 manages the wireless network. For example, the management apparatus 20 is a device that manages communication of the base station 30. The management apparatus 20 may be, for example, a device having a function as a mobility management entity (MME). The management apparatus 20 may be a device having a function as an access and mobility management function (AMF) and/or a session management function (SMF). Naturally, functions of the management apparatus 20 are not limited to the MME, the AMF, and the SMF. The management apparatus 20 may be a device having a function as a policy control function (PCF) or a home subscriber server (HSS). Furthermore, the management apparatus 20 may be a device having a network slice selection function (NSSF), an authentication server function (AUSF), or a function as unified data management (UDM).

Note that the management apparatus 20 may have a function of the gateway. For example, the management apparatus 20 may have a function as a serving gateway (S-GW) or a packet data network gateway (P-GW). In addition, the management apparatus 20 may have a function as a user plane function (UPF).

The core network includes a plurality of network functions, and each network function may be aggregated into one physical device or distributed to a plurality of physical devices. In other words, the management apparatus 20 can be dispersedly arranged in a plurality of devices. Further, this distributed arrangement may be controlled to be performed dynamically. The base station 30 and the management apparatus 20 configure one network, and provide a wireless communication service to the terminal device 40. The management apparatus 20 is connected to the Internet, and the terminal device 40 can use various services provided via the Internet via the base station 30.

Note that the management apparatus 20 is not necessarily a device configuring the core network. For example, it is assumed that the core network is a wideband code division multiple access (W-CDMA) or a code division multiple access 2000 (cdma2000) core network. In this case, the management apparatus 20 may be a device that functions as a radio network controller (RNC).

Figure 6:
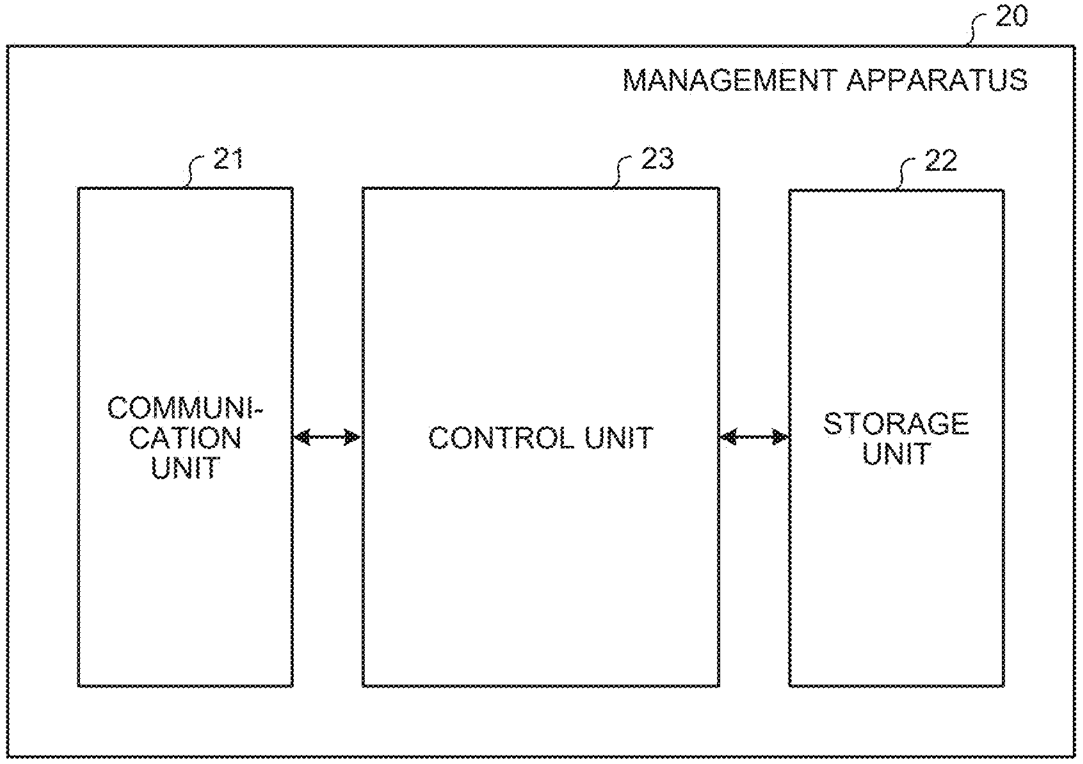
FIG. 6 is a diagram illustrating a configuration example of a management apparatus according to the embodiment of the present disclosure.

FIG. 6 is a diagram illustrating a configuration example of the management apparatus 20 according to the embodiment of the present disclosure. The management apparatus 20 includes a communication unit 21, a storage unit 22, and a control unit 23. Note that the configuration illustrated in FIG. 6 is a functional configuration, and a hardware configuration may be different from the functional configuration. Furthermore, functions of the management apparatus 20 may be implemented in a statistically or dynamically distributed manner in a plurality of physically separated structures. For example, the management apparatus 20 may include a plurality of server devices.

The communication unit 21 is a communication interface for communicating with other devices. The communication unit 21 may be a network interface or a device connection interface. For example, the communication unit 21 may be a local area network (LAN) interface such as a network interface card (NIC), or may be a universal serial bus (USB) interface including a USB host controller, a USB port, and the like. Furthermore, the communication unit 21 may be a wired interface or a wireless interface. The communication unit 21 functions as a communication means of the management apparatus 20. The communication unit 21 communicates with the base station 30 and the like under the control of the control unit 23.

The storage unit 22 is a data readable/writable storage device such as a dynamic random access memory (DRAM), a static random access memory (SRAM), a flash memory, or a hard disk. The storage unit 22 functions as a storage means of the management apparatus 20. The storage unit 22 stores, for example, a connection state of the terminal device 40. For example, the storage unit 22 stores a radio resource control (RRC) state, an EPS connection management (ECM) state, or a 5G system connection management (CM) state of the terminal device 40. The storage unit 22 may function as a home memory that stores position information of the terminal device 40.

The control unit 23 is a controller that controls each part of the management apparatus 20. The control unit 23 is realized by, for example, a processor such as a central processing unit (CPU), a micro processing unit (MPU), or a graphics processing unit (GPU). For example, the control unit 23 is implemented by a processor executing various programs stored in a storage device inside the management apparatus 20 using a random access memory (RAM) or the like as a work area. Note that the control unit 23 may be realized by an integrated circuit such as an application specific integrated circuit (ASIC) or a field programmable gate array (FPGA). Any of the CPU, the MPU, the GPU, the ASIC, and the FPGA can be regarded as the controller.

<2-4. Configuration Example of Base Station>

Next, a configuration of the base station 30 will be described.

The base station 30 is a wireless communication apparatus that performs wireless communication with the terminal device 40. The base station 30 may be configured to wirelessly communicate with the terminal device 40 via another terminal device 40, or may be configured to directly perform wirelessly communication with the terminal device 40.

The base station 30 is one type of the communication apparatus. The base station 30 is, for example, a device corresponding to a radio base station (e.g., base station, Node B, eNB, and gNB) or a radio access point. The base station 30 may be a wireless relay station. Furthermore, the base station 30 may be one or more (or all) extension devices of a distributed radio base station called a remote radio head (RRH) or a radio unit (RU). The extension device may or may not be integrated with an antenna, such as an antenna integrated radio facility, or may be an antenna integrated radio facility having a massive multi input multi output (MIMO) radio communications technology. A part of the distributed radio base station may also be referred to as a node in a distributed antenna system (DAS). Furthermore, the base station 30 may be a receiving station such as a field pickup unit (FPU). Furthermore, the base station 30 may be an integrated access and backhaul (IAB) donor node or an IAB relay node that provides a radio access line and a radio backhaul line by time division multiplexing, frequency division multiplexing, or space division multiplexing.

Note that the radio access technology used by the base station 30 may be the cellular communication technology or the wireless LAN technology. Obviously, the radio access technology used by the base station 30 is not limited thereto, and may be other radio access technologies. For example, the radio access technology used by the base station 30 may be a low power wide area (LPWA) communication technology. In addition, the wireless communication used by the base station 30 may be wireless communication using millimeter waves. Furthermore, the wireless communication used by the base station 30 may be wireless communication using radio waves or wireless communication (optical) using infrared rays or visible light.

The base station 30 may be capable of non-orthogonal multiple access (NOMA) communication with the terminal device 40. Here, the NOMA communication is communication using a non-orthogonal resource (transmission, reception, or both). Note that the base station 30 may be able to perform the NOMA communication with another base station 30.

Note that the base stations 30 may be capable of communicating with each other via a base station-core network interface (e.g., NG interface and S1 interface). This interface may be either wired or wireless. Furthermore, the base stations may be capable of communicating with each other via an inter-base station interface (e.g., Xn interface, X2 interface, S1 interface, and F1 interface). This interface may be either wired or wireless.

Note that the concept of the base station includes not only a donor base station but also a relay base station (also referred to as the relay station). For example, the relay base station may be any one of RF repeater, smart repeater, and intelligent surface. In addition, the concept of the base station includes not only a structure having a function of the base station but also a device installed in the structure.

The structure is, for example, a building such as a high-rise building, a house, a steel tower, a station facility, an airport facility, a harbor facility, an office building, a school building, a hospital, a factory, a commercial facility, or a stadium. Note that the concept of the structure includes not only a building but also a non-building structure such as a tunnel, a bridge, a dam, a wall, or an iron pillar, and equipment such as a crane, a gate, or a windmill. In addition, the concept of the structure includes not only a structure on land (on the ground in a narrow sense) or underground, but also a structure on water such as a platform or a megafloat, and a structure under water such as a marine observation facility. The base station can be rephrased as the information processing apparatus.

The base station 30 may be the donor station or the relay station. Furthermore, the base station 30 may be a fixed station or a mobile station. The mobile station is a wireless communication apparatus (e.g., base station) configured to be movable. In this case, the base station 30 may be a device installed in the mobile body or may be the mobile body itself. For example, the relay station having mobility can be regarded as the base station 30 as the mobile station. In addition, a device that is originally a device having the mobility and has a function of the base station (at least a part of the function of the base station), such as a vehicle, an unmanned aerial vehicle (UAV) as typified by a drone, or a smartphone, also corresponds to the base station 30 as the mobile station.

Here, the mobile body may be a mobile terminal such as a smartphone or a mobile phone. In addition, the mobile body may be a mobile body that travels on land (ground in a narrow sense) (e.g., vehicle including an automobile, a bicycle, a bus, a truck, a motorcycle, a train, and a linear motor car) or a mobile body (e.g., subway) that travels underground (e.g., inside tunnel). In addition, the mobile body may be a mobile body that travels on water (e.g., ship such as a passenger ship, a cargo ship, or a hovercraft) or a mobile body that moves under water (e.g., submersibles such as a submersible vessel, a submarine, and an unmanned submarine). Sill more, the mobile body may be a mobile body that moves in the atmosphere (e.g., aircraft such as an airplane, an airship, or a drone).

Furthermore, the base station 30 may be a ground base station (ground station) installed on the ground. For example, the base station 30 may be a base station installed in a structure on the ground, or may be a base station installed in a mobile body moving on the ground. More specifically, the base station 30 may be an antenna installed in a structure such as a building and a signal processing device connected to the antenna. Obviously, the base station 30 may be the structure or the mobile body itself. The "ground" in a broad sense includes not only land (ground in a narrow sense) but also underground, on water, and under water. Note that the base station 30 is not limited to the ground base station. For example, when the communication system 1 is a satellite communication system, the base station 30 may be an aircraft station. From the perspective of the satellite station, the aircraft station located on the earth is a ground station.

Note that the base station 30 is not limited to the ground station. The base station 30 may be a non-ground base station (non-ground station) capable of floating in the air or space. For example, the base station 30 may be an aircraft station or a satellite station.

The satellite station is a satellite station capable of floating outside the atmosphere. The satellite station may be a device mounted on a space mobile body such as an artificial satellite, or may be the space mobile body itself. The space mobile body is a mobile body that moves outside the atmosphere. Examples of the space mobile body include artificial bodies such as an artificial satellite, a spacecraft, a space station, and a probe.

The satellite serving as the satellite station may be any of a low earth orbiting (LEO) satellite, a medium earth orbiting (MEO) satellite, a geostationary earth orbiting (GEO) satellite, and a highly elliptical orbiting (HEO) satellite. Obviously, the satellite station may be a device mounted on the LEO satellite, the MEO satellite, the GEO satellite, or the HEO satellite.

The aircraft station is a wireless communication apparatus capable of floating in the atmosphere, such as an aircraft. The aircraft station may be a device mounted on an aircraft or the like, or may be the aircraft itself. Note that the concept of the aircraft includes not only a heavy aircraft such as an airplane and a glider but also a light aircraft such as a balloon and an airship. In addition, the concept of the aircraft includes not only heavy and light aircrafts but also a rotorcraft such as a helicopter and an autogyroscope. Note that the aircraft station (or the aircraft on which an aircraft station is mounted) may be an unmanned aerial vehicle such as a drone.

Note that the concept of the unmanned aerial vehicle also includes an unmanned aircraft system (UAS) and a tethered UAS. The concept of the unmanned aerial vehicle also includes lighter than air (LTA) UAS and heavier than air (HTA) UAS. Furthermore, the concept of unmanned aerial vehicles also includes high altitude UAS platforms (HAPs).

A coverage of the base station 30 may be large such as a macro cell to small such as a pico cell. It is apparent that a magnitude of the coverage of the base station 30 may be extremely small such as a femto cell. Further, the base station 30 may have a beamforming capability. In this case, the base station 30 may form a cell or a service area for each beam.

Figure 7:
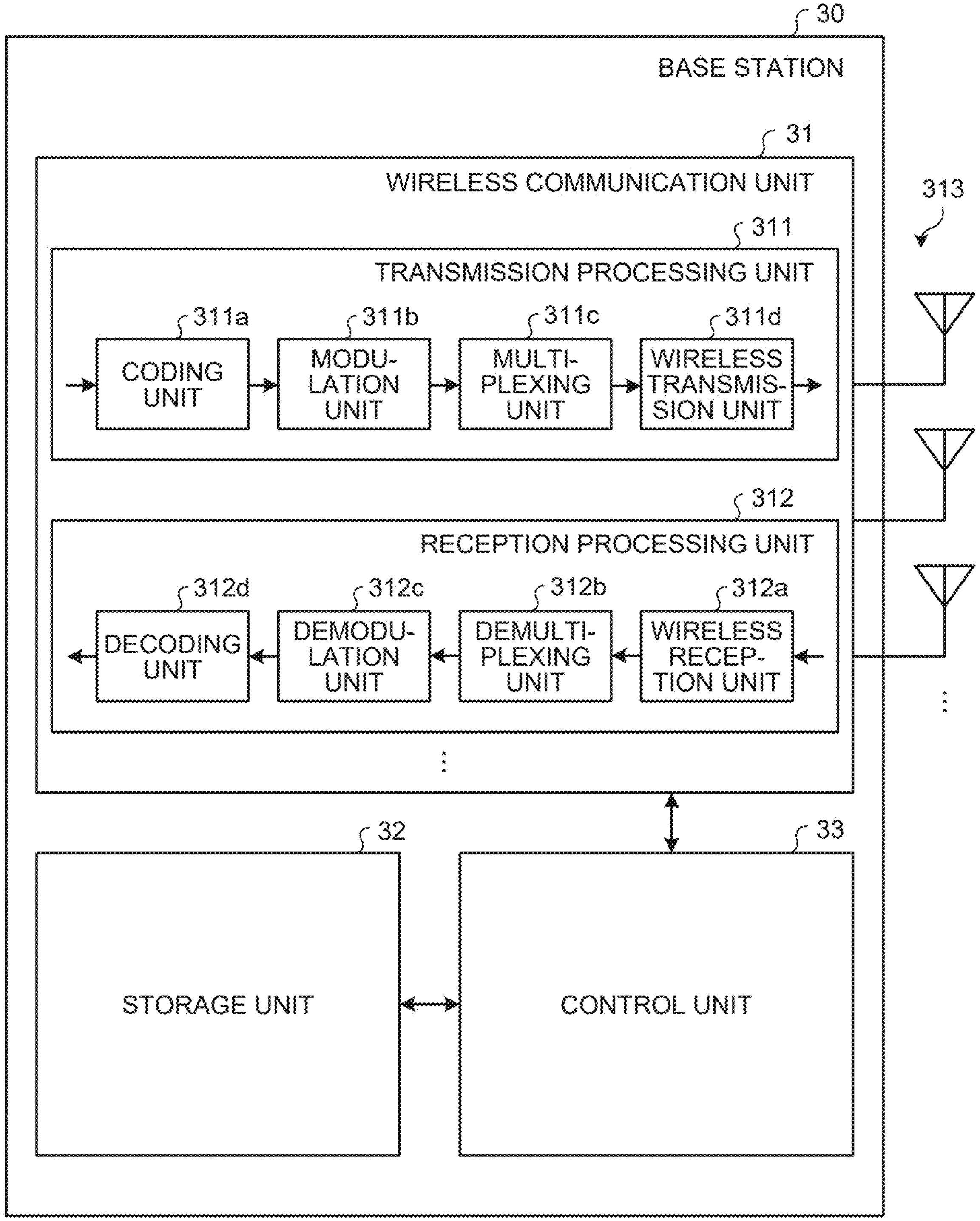
FIG. 7 is a diagram illustrating a configuration example of a base station according to the embodiment of the present disclosure.

FIG. 7 is a diagram illustrating a configuration example of the base station 30 according to the embodiment of the present disclosure. The base station 30 includes a wireless communication unit 31, a storage unit 32, and a control unit 33. Note that the configuration illustrated in FIG. 7 is a functional configuration, and a hardware configuration may be different from the functional configuration. Furthermore, functions of the base station 30 may be implemented in a distributed manner in a plurality of physically separated configurations.

The wireless communication unit 31 is a signal processing unit for wirelessly communicating with another wireless communication apparatus (e.g., terminal device 40). The wireless communication unit 31 operates under the control of the control unit 33. The wireless communication unit 31 supports one or a plurality of radio access systems. For example, the wireless communication unit 31 supports both the NR and the LTE. The wireless communication unit 31 may be compatible with the W-CDMA or cdma2000 in addition to the NR or the LTE. Furthermore, the wireless communication unit 31 may support an automatic retransmission technology such as hybrid automatic repeat request (HARQ). Furthermore, the wireless communication unit 31 may support a wireless communication function of a wireless LAN system such as Wi-Fi in addition to the wireless communication function of the cellular system. The communication function of the wireless LAN system may be compatible with current Wi-Fi6 (IEEE802.11ax), or may be compatible with a conventional system prior to Wi-Fi5 (IEEE802.11a, IEEE802.11b, IEEE802.11g, IEEE802.11n, IEEE802.11ac, etc.). In addition, the wireless LAN system may be a wireless LAN method that will be standardized in the future in the Wi-Fi Alliance or the IEEE802.11 committee.

The wireless communication unit 31 includes a transmission processing unit 311, a reception processing unit 312, and an antenna 313. The wireless communication unit 31 may include a plurality of transmission processing units 311, a plurality of reception processing units 312, and a plurality of antennas 313. When the wireless communication unit 31 supports a plurality of radio access methods, each part of the wireless communication unit 31 can be configured individually for each radio access method. For example, the transmission processing unit 311 and the reception processing unit 312 may be individually configured for the LTE and the NR. Furthermore, the antenna 313 may include a plurality of antenna elements (e.g., a plurality of patch antennas). In this case, the wireless communication unit 31 may be configured to be beamformable. The wireless communication unit 31 may be configured to be able to perform polarization beamforming using vertically polarized waves (V-polarized waves) and horizontally polarized waves (H-polarized waves).

The transmission processing unit 311 performs a transmission process of downlink control information and downlink data. For example, the transmission processing unit 311 encodes the downlink control information and the downlink data input from the control unit 33 using an encoding system such as block encoding, convolutional encoding, or turbo encoding. Here, the encoding may be performed by polar code encoding or low density parity check code (LDPC code) encoding. Then, the transmission processing unit 311 modulates coded bits by a predetermined modulation scheme such as BPSK, QPSK, 16QAM, 64QAM, or 256QAM. In this case, signal points on constellation do not necessarily have to be equidistant. The constellation may be a non uniform constellation (NUC). The transmission processing unit 311 multiplexes a modulation symbol of each channel and a downlink reference signal, and arranges a multiplexed result in a predetermined resource element.

Then, the transmission processing unit 311 performs various types of signal processing on a multiplexed signal. For example, the transmission processing unit 311 performs processes such as conversion into a frequency domain by fast Fourier transform, addition of a guard interval, generation of a baseband digital signal, conversion into an analog signal, quadrature modulation, up-conversion, removal of an extra frequency component, and power amplification. A signal generated by the transmission processing unit 311 is transmitted from the antenna 313.

The reception processing unit 312 processes an uplink signal received via the antenna 313. For example, the reception processing unit 312 performs, with respect to the uplink signal, down-conversion, removal of an unnecessary frequency component, control of an amplification level, quadrature demodulation, conversion into a digital signal, removal of a guard interval (cyclic prefix), extraction of a frequency domain signal by fast Fourier transform, and the like. In this case, the reception processing unit 312 separates an uplink channel, such as a physical uplink shared channel (PUSCH) and a physical uplink control channel (PUCCH), and an uplink reference signal from a signal after the above processing is performed. The reception processing unit 312 demodulates a reception signal using a modulation scheme such as binary phase shift keying (BPSK) or quadrature phase shift keying (QPSK) with respect to a modulation symbol of the uplink channel. The modulation scheme used for demodulation may be 16 quadrature amplitude modulation (16QAM), 64QAM, or 256QAM. In this case, signal points on constellation do not necessarily have to be equidistant. The constellation may be a non-uniform constellation (NUC). The reception processing unit 312 decodes encoded bits of a demodulated uplink channel. Decoded uplink data and uplink control information are output to the control unit 33.

The antenna 313 is an antenna device (antenna unit) that mutually converts a current and a radio wave. The antenna 313 may include one antenna element (e.g., one patch antenna) or may include a plurality of antenna elements (e.g., a plurality of patch antennas). When the antenna 313 includes a plurality of antenna elements, the wireless communication unit 31 may be configured to be beamformable. For example, the wireless communication unit 31 may be configured to generate a directional beam by controlling the directivity of a radio signal using the plurality of antenna elements. Note that the antenna 313 may be a dual-polarized antenna. When the antenna 313 is a dual-polarized antenna, the wireless communication unit 31 may use vertically polarized waves (V-polarized waves) and horizontally polarized waves (H-polarized waves) to transmit radio signals. Then, the wireless communication unit 31 may control directivity of the radio signal transmitted using the vertically polarized wave and the horizontally polarized wave. Furthermore, the wireless communication unit 31 may transmit and receive spatially multiplexed signals via a plurality of layers including the plurality of antenna elements.

The storage unit 32 is a storage device capable of reading and writing data such as the DRAM, the SRAM, the flash memory, or the hard disk. The storage unit 32 functions as a storage means of the base station 30.

The control unit 33 is a controller that controls each part of the base station 30. The control unit 33 is realized by, for example, a processor such as a central processing unit (CPU) or a micro processing unit (MPU). For example, the control unit 33 is implemented by a processor executing various programs stored in the storage device inside the base station 30 using the random access memory (RAM) or the like as a work area. Note that the control unit 33 may be realized by an integrated circuit such as an application specific integrated circuit (ASIC) or a field programmable gate array (FPGA). Any of the CPU, the MPU, the ASIC, and the FPGA can be regarded as the controller. Furthermore, the control unit 33 may be realized by a graphics processing unit (GPU) in addition to or instead of the CPU.

In some embodiments, the concept of a base station may consist of a collection of multiple physical or logical devices. For example, in this embodiment, the base station may be distinguished into a plurality of devices such as a baseband unit (BBU) and a radio unit (RU). Then, the base station may be interpreted as an assembly of the plurality of devices. In addition, the base station may be either or both of the BBU and the RU. The BBU and the RU may be connected by a predetermined interface (e.g., enhanced common public radio interface (eCPRI)). The RU may be rephrased as a remote radio unit (RRU) or a radio DoT (RD). Furthermore, the RU may correspond to a gNB distributed unit (gNB-DU) described later. Further, the BBU may correspond to a gNB central unit (gNB-CU) described later. Alternatively, the RU may be a wireless device connected to the gNB-DU described later. The gNB-CU, the gNB-DU, and the RU connected to the gNB-DU may be configured to conform to an open radio access network (O-RAN). Further, the RU may be a device integrally formed with the antenna. The antenna (e.g., antenna integrally formed with RU) included in the base station may adopt an advanced antenna system and support MIMO (e.g., FD-MIMO) or beamforming. Furthermore, the antenna included in the base station may include, for example, 64 transmission antenna ports and 64 reception antenna ports.

In addition, the antenna mounted on the RU may be an antenna panel including one or more antenna elements, and the RU may be mounted with one or more antenna panels. For example, the RU may be mounted with two antenna panels of a horizontally polarized antenna panel and a vertically polarized antenna panel, or two antenna panels of a clockwise circularly polarized antenna panel and a counterclockwise circularly polarized antenna panel. In addition, the RU may form and control an independent beam for each antenna panel.

Note that a plurality of base stations may be connected to each other. The one or more base stations may be included in a radio access network (RAN). In this case, the base station may be simply referred to as a PAN, a PAN node, an access network (AN), or an AN node. Note that the RAN in the LTE is sometimes referred to as an enhanced universal terrestrial RAN (EUTRAN). In addition, the RAN in the NR may be referred to as NGRAN. In addition, the RAN in the W-CDMA (UMTS) is sometimes referred to as UTRAN.

Note that an LTE base station may be referred to as an evolved node B (eNodeB) or an eNB. In this case, the EUTRAN includes one or more eNodeBs (eNBs). Further, an NR base station may be referred to as a gNodeB or a gNB. In this case, the NGRAN includes one or more gNBs. The EUTRAN may include the gNB (en-gNB) connected to the core network (EPC) in an LTE communication system (EPS). Similarly, the NGRAN may include an ng-eNB connected to a core network 5GC in a 5G communication system (5GS).

When the base station is the eNB, the gNB, or the like, the base station may be referred to as a 3GPP access. In addition, when the base station is the radio access point, the base station may be referred to as a non-3GPP access. Further, the base station may be an optical extension device called a remote radio head (RRH) or a radio unit (RU). Furthermore, in a case where the base station is the gNB, the base station may be a combination of the gNB-CU and the gNB-DU described above, or may be any one of the gNB-CU and the gNB-DU.

Here, the gNB-CU hosts a plurality of upper layers (e.g., radio resource control (RRC), service data adaptation protocol (SDAP), and packet data convergence protocol (PDCP)) in an access stratum for communication with the UE. On the other hand, the gNB-DU hosts a plurality of lower layers (e.g., radio link control (RLC), medium access control (MAC), and physical layer (PHY) in an access stratum. In other words, among messages/information to be described later, RRC signaling (semi-static notification) may be generated by the gNB-CU, while MAC CE and DCI (dynamic notification) may be generated by the gNB-DU. Alternatively, in the RRC configuration (semi-static notification), for example, some configurations such as IE: cellGroupConfig may be generated by the gNB-DU, and the remaining configurations may be generated by the gNB-CU. These configurations may be transmitted and received through an F1 interface described later.

Note that the base station may be configured to be able to communicate with another base station. For example, when a plurality of base stations is the eNBs or a combination of the eNB and the en-gNB, the base stations may be connected by an X2 interface. Furthermore, in a case where a plurality of base stations are the gNBs or a combination of the gn-eNB and the gNB, the devices may be connected by an Xn interface. Furthermore, in a case where a plurality of base stations is a combination of the gNB-CU and the gNB-DU, the devices may be connected by the above-described F1 interface. A message/information (e.g., RRC signaling, MAC control element (MAC CE), or DCI) to be described later may be transmitted between a plurality of base stations, for example, via the X2 interface, the Xn interface, or the F1 interface.

The cell provided by the base station is referred to as, for example, a serving cell. The serving cell may include a primary cell (PCell) and a secondary cell (SCell). When dual connectivity is configured for the UE (e.g., terminal device 40), the PCell provided by a master node (MN) and zero or one or more SCells may be referred to as a master cell group. Examples of the dual connectivity include EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity.

Further, the serving cell may include a primary secondary cell (PSCell) or primary SCG cell. In other words, when the dual connectivity is set to the UE, the PSCell provided by the secondary node (SN) and zero or one or more SCells are referred to as a secondary cell group (SCG). Unless specially configured (e.g., PUCCH on SCell), a physical uplink control channel (PUCCH) is transmitted in the PCell and the PSCell, but is not transmitted in the SCell. In addition, a radio link failure is also detected in the PCell and the PSCell, but is not detected in the SCell (may not be detected). As described above, since the PCell and the PSCell have a special role in the serving cell, they are also referred to as a special cell (SpCell).

In one cell, one downlink component carrier and one uplink component carrier may be associated. Further, a system bandwidth corresponding to one cell may be divided into a plurality of bandwidth parts (BWP). In this case, one or more BWP may be set to the UE, and the UE may use one BWP as an active BWP. In addition, radio resources that can be used by the terminal device 40 (e.g., frequency bandwidth, numerology (subcarrier spacing), and slot configuration) may be different for each cell, each component carrier, or each BWP.

<2-5. Configuration Example of Terminal Device>

Next, a configuration of the terminal device 40 will be described.

The terminal device 40 is a wireless communication apparatus that wirelessly communicates with other communication apparatuses (e.g., base station 30 and another terminal device 40). For example, the terminal device 40 may be a mobile phone, a smart device (smartphone or tablet), a personal digital assistant (PDA), or a personal computer. Furthermore, the terminal device 40 may be a device such as a business-use camera provided with a communication function, or may be a motorcycle, a moving relay vehicle, or the like on which a communication apparatus such as a field pickup unit (FPU) is mounted. Furthermore, the terminal device 40 may be a relay station that relays communication between an external device (e.g., another terminal device 40) and the base station 30, such as customer premises equipment (CPE). Furthermore, the terminal device 40 may be a machine to machine (M2M) device, a device to device (D2D) device, or an Internet of Things (IoT) device.

Note that the terminal device 40 may be able to perform the NOMA communication with other communication apparatuses (e.g., base station 30 and another terminal device 40). Furthermore, the terminal device 40 may be capable of using an automatic retransmission technology such as HARQ when communicating with the base station 30. Further, the terminal device 40 may be capable of performing sidelink communication with another terminal device 40. The terminal device 40 may also be capable of using the automatic retransmission technology such as HARQ when performing the sidelink communication. Note that the terminal device 40 may also be capable of the NOMA communication in communication (sidelink) with another terminal device 40. Furthermore, the terminal device 40 may be capable of performing LPWA communication with other communication apparatuses (e.g., base station 30 and another terminal device 40). Furthermore, wireless communication used by the terminal device 40 may be wireless communication using millimeter waves. Note that the wireless communication (including sidelink communication) used by the terminal device 40 may be wireless communication using radio waves or wireless communication (optical) using infrared rays or visible light.

Furthermore, the terminal device 40 may be a mobile device. The mobile device is a mobile wireless communication apparatus. In this case, the terminal device 40 may be a wireless communication apparatus installed in a mobile body or may be the mobile body itself. For example, the terminal device 40 may be a vehicle that moves on a road, such as an automobile, a bus, a truck, or a motorcycle, or a wireless communication apparatus mounted on the vehicle. Note that the mobile body may be a mobile terminal, or may be the mobile body that travels on land (on the ground in a narrow sense), underground, on water, or under water. Furthermore, the mobile body may be mobile body that moves inside the atmosphere, such as a drone, a helicopter, or an aircraft, or may be a mobile body that moves outside the atmosphere, such as an artificial satellite, or an object that flies, stands still, or quasi-stands still in space.

The terminal device 40 may be simultaneously connected to a plurality of base stations or a plurality of cells to perform communication. For example, when one base station supports a communication area via a plurality of cells (e.g., pCell and sCell), it is possible to bundle radio waves of the plurality of cells and communicate between the base station 30 and the terminal device 40 by a carrier aggregation (CA) technology, a dual connectivity (DC) technology, or a multi-connectivity (MC) technology. Alternatively, the terminal device 40 and the plurality of base stations 30 can communicate with each other by a coordinated multi-point transmission and reception (CoMP) technology via cells of different base stations 30.

Figure 8:
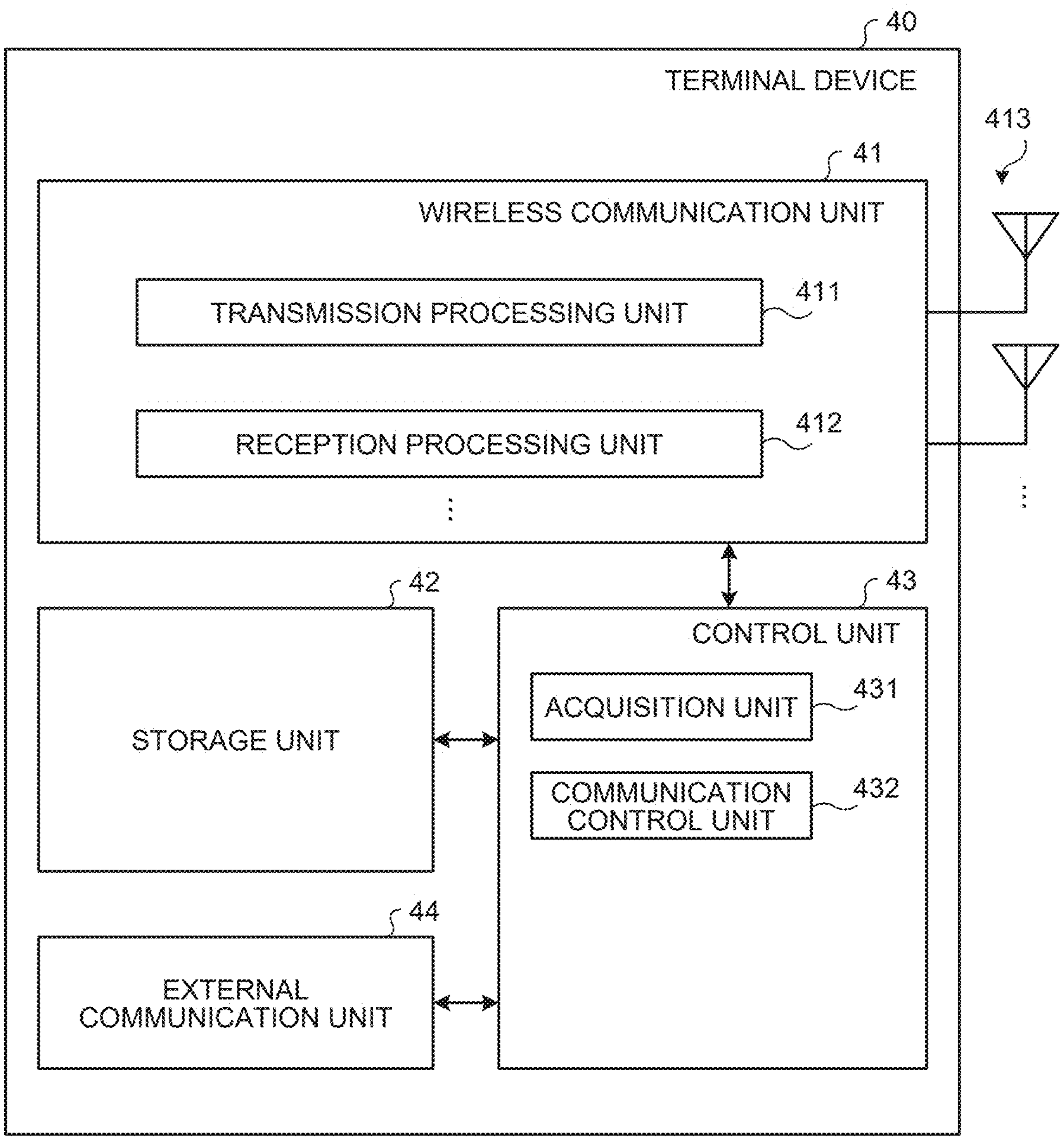
FIG. 8 is a diagram illustrating a configuration example of a terminal device according to the embodiment of the present disclosure.

FIG. 8 is a diagram illustrating a configuration example of the terminal device 40 according to the embodiment of the present disclosure. The terminal device 40 includes a wireless communication unit 41, a storage unit 42, a control unit 43, and an external communication unit 44. Note that the configuration illustrated in FIG. 8 is a functional configuration, and a hardware configuration may be different from the functional configuration. Furthermore, functions of the terminal device 40 may be implemented in a distributed manner in a plurality of physically separated configurations.

The wireless communication unit 41 is a signal processing unit for wirelessly communicating with other wireless communication apparatuses (e.g., base station 30 and another terminal device 40). The wireless communication unit 41 operates under the control of the control unit 43. The wireless communication unit 41 includes a transmission processing unit 411, a reception processing unit 412, and an antenna 413. Configurations of the wireless communication unit 41, the transmission processing unit 411, the reception processing unit 412, and the antenna 413 may be similar to those of the wireless communication unit 31, the transmission processing unit 311, the reception processing unit 312, and the antenna 313 of the base station 30. Further, the wireless communication unit 41 may be configured to be beamformable similarly to the wireless communication unit 31. Further, similarly to the wireless communication unit 31, the wireless communication unit 41 may be configured to be capable of transmitting and receiving spatially multiplexed signals.

The storage unit 42 is a storage device capable of reading and writing data, such as a DRAM, an SRAM, a flash memory, or a hard disk. The storage unit 42 functions as a storage means of the terminal device 40.

The control unit 43 is a controller that controls each part of the terminal device 40. The control unit 43 is realized by, for example, a processor such as the CPU or the MPU. For example, the control unit 43 is realized by a processor executing various programs stored in a storage device inside the terminal device 40 using the RAM or the like as a work area. Note that the control unit 43 may be realized by an integrated circuit such as the ASIC or the FPGA. Any of the CPU, the MPU, the ASIC, and the FPGA can be regarded as the controller. Furthermore, the control unit 43 may be realized by the GPU in addition to or instead of the CPU.

As illustrated in FIG. 8, the control unit 43 includes an acquisition unit 431 and a communication control unit 432. Each block (acquisition unit 431 and communication control unit 432) configuring the control unit 43 is a functional block indicating each function of the control unit 34. These functional blocks may be software blocks or hardware blocks. For example, each of the functional blocks described above may be one software module realized by software (microprogram), or may be one circuit block on a semiconductor chip (die). It is apparent that each functional block may be one processor or one integrated circuit. A configuration method of the functional blocks is arbitrary. Note that the control unit 43 may be configured by a functional unit different from the above-described functional block.

The external communication unit 44 is a communication interface for communicating with an external device (e.g., another terminal device 40). The external communication unit 44 may be a network interface or a device connection interface. For example, the external communication unit 44 may be a LAN interface such as the NIC, or may be a USB interface configured by a universal serial bus (USB) host controller, a USB port, or the like. Furthermore, the external communication unit 44 may be a wired interface or a wireless interface.

3. Use Case

The configuration of the communication system 1 has been described above. Next, a use case of the present embodiment will be described.

As described above, the communication apparatus of the present embodiment is, for example, the UE in which an aggregate of the plurality of cells is configured as illustrated in FIG. 1. The communication apparatus (e.g., terminal device 40) according to the present embodiment acquires information calculated based on information on a delay time between application layers of the upstream transmission. For example, the communication apparatus calculates the evaluation value for each cell based on information on the transmission delay time between the host application installed in the transmission device (e.g., terminal device 40 or an external device connected to the terminal device 40) and the host application installed in the reception device (e.g., server 10). At this time, the delay time information may be transmitted from the application layer (host application) to the PDCP layer of the communication apparatus. Then, the communication apparatus (e.g., PDCP layer) starts the upstream transmission from a cell in which the delay time of the upstream transmission is evaluated to be small, among the plurality of cells, based on the information (e.g., evaluation value).

(1) Use Case 1

Figure 9:
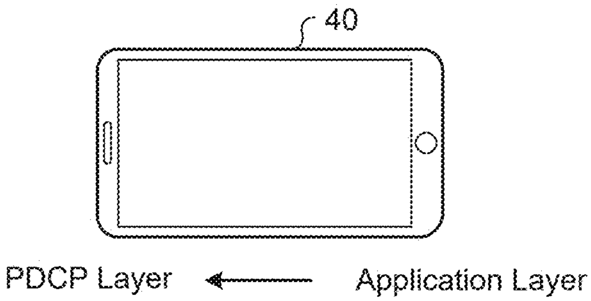
FIG. 9 is a diagram illustrating an example of a use case of a technology of the present embodiment.

FIG. 9 is a diagram illustrating an example of the use case of the technology of the present embodiment. In the example in FIG. 9, both the communication apparatus and the transmission device are the same terminal device 40 (e.g., smartphone). In the example in FIG. 9, the delay time between the application layer of the terminal device 40 and the application layer of the server 10 is detected in the application layer of the terminal device 40. Delay time information detected is transmitted from the application layer of the terminal device 40 to the PDCP layer of the terminal device 40. The PDCP layer of the terminal device 40 calculates the evaluation value for each cell based on the delay time information, and starts the upstream transmission from a cell in which the delay time of the upstream transmission is evaluated to be small.

(2) Use Case 2

Figure 10:
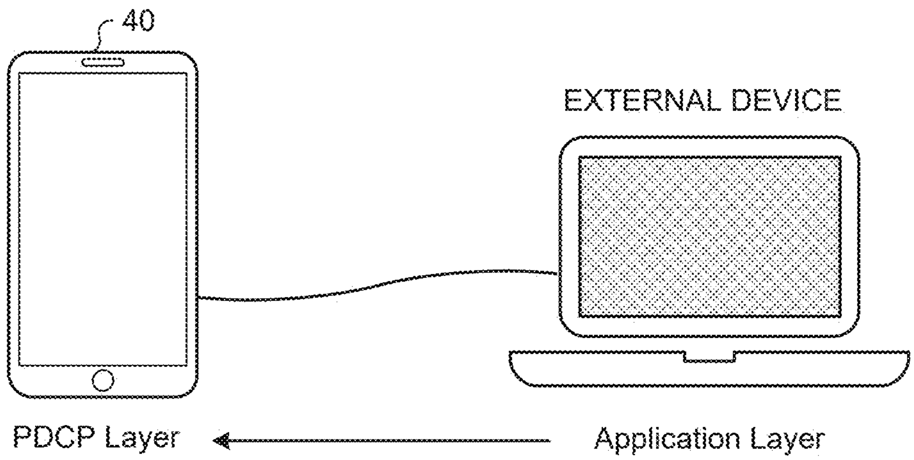
FIG. 10 is a diagram illustrating another example of the use case of the technology of the present embodiment.

FIG. 10 is a diagram illustrating another example of the use case of the technology of the present embodiment. In the example in FIG. 10, the communication apparatus is the terminal device 40 (e.g., smartphone), and the transmission device is an external device (e.g., another terminal device 40 such as a personal computer or the like or a video device such as a camera). In the example in FIG. 10, the terminal device 40 and the external device are connected by wire. In the example in FIG. 10, the delay time between the application layer of the external device and the application layer of the server 10 is detected in the application layer of the external device. Delay time information detected is transmitted from the application layer of the external device to the PDCP layer of the terminal device 40. The PDCP layer of the terminal device 40 calculates the evaluation value for each cell based on the delay time information, and starts the upstream transmission from a cell in which the delay time of the upstream transmission is evaluated to be small.

(3) Use Case 3

Figure 11:
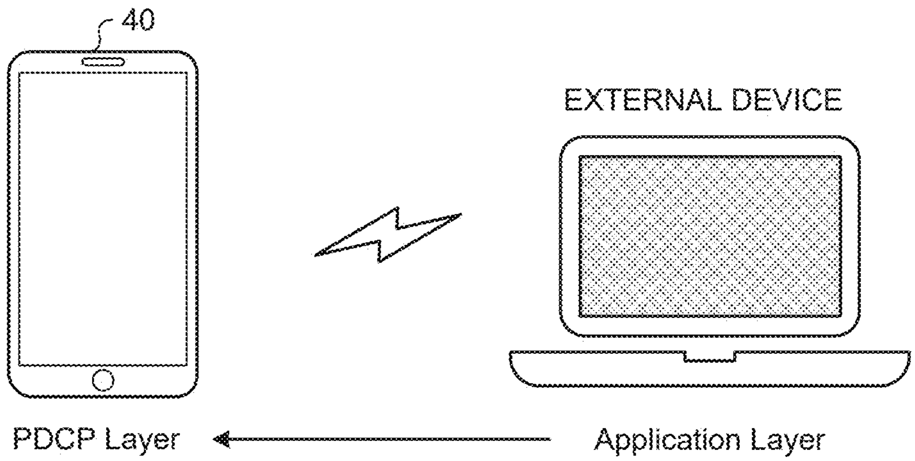
FIG. 11 is a diagram illustrating another example of the use case of the technology of the present embodiment.

FIG. 11 is a diagram illustrating another example of the use case of the technology of the present embodiment. In the example in FIG. 11, the communication apparatus is the terminal device 40 (e.g., smartphone), and the transmission device is an external device (e.g., another terminal device 40 such as a personal computer or a video device such as a camera). In the example in FIG. 11, the terminal device 40 and the external device are wirelessly connected. In the example in FIG. 11, the delay time between the application layer of the external device and the application layer of the server 10 is detected in the application layer of the external device. Delay time information detected is transmitted from the application layer of the external device to the PDCP layer of the terminal device 40. The PDCP layer of the terminal device 40 calculates the evaluation value for each cell based on the delay time information, and starts the upstream transmission from a cell in which the delay time of the upstream transmission is evaluated to be small.

(4) Use Case 4

Figure 12:
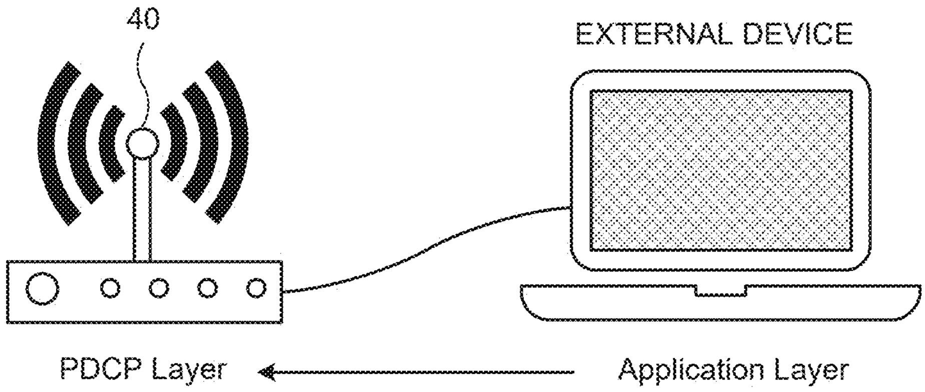
FIG. 12 is a diagram illustrating another example of the use case of the technology of the present embodiment.

FIG. 12 is a diagram illustrating another example of the use case of the technology of the present embodiment. In the example in FIG. 12, the communication apparatus is the terminal device 40 (e.g., router or CPE), and the transmission device is an external device (e.g., another terminal device 40 such as a personal computer or a video device such as a camera). In the example in FIG. 12, the terminal device 40 and the external device are connected by wire. In the example in FIG. 12, the delay time between the application layer of the external device and the application layer of the server 10 is detected in the application layer of the external device. Delay time information detected is transmitted from the application layer of the external device to the PDCP layer of the terminal device 40. The PDCP layer of the terminal device 40 calculates the evaluation value for each cell based on the delay time information, and starts the upstream transmission from a cell in which the delay time of the upstream transmission is evaluated to be small.

(5) Use Case 5

Figure 13:
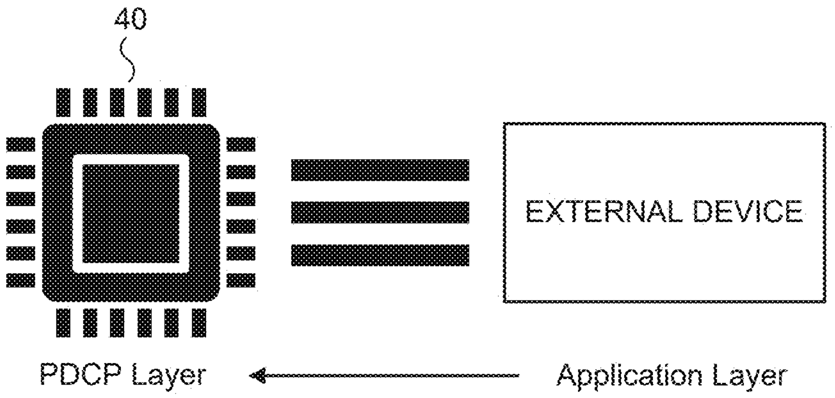
FIG. 13 is a diagram illustrating another example of the use case of the technology of the present embodiment.

FIG. 13 is a diagram illustrating another example of the use case of the technology of the present embodiment. In the example in FIG. 13, the communication apparatus is the terminal device 40 (e.g., communication module), and the transmission device is an external device (e.g., another terminal device 40 such as a personal computer or a video device such as a camera). In the example in FIG. 13, the terminal device 40 and the external device are connected by an internal bus or an external bus. In the example in FIG. 13, the delay time between the application layer of the external device and the application layer of the server 10 is detected in the application layer of the external device. Delay time information detected is transmitted from the application layer of the external device to the PDCP layer of the terminal device 40. The PDCP layer of the terminal device 40 calculates the evaluation value for each cell based on the delay time information, and starts the upstream transmission from a cell in which the delay time of the upstream transmission is evaluated to be small.

The use cases of the present embodiment have been described above. Next, the operation of the communication system 1 will be described.

4. First Embodiment

Figure 14:
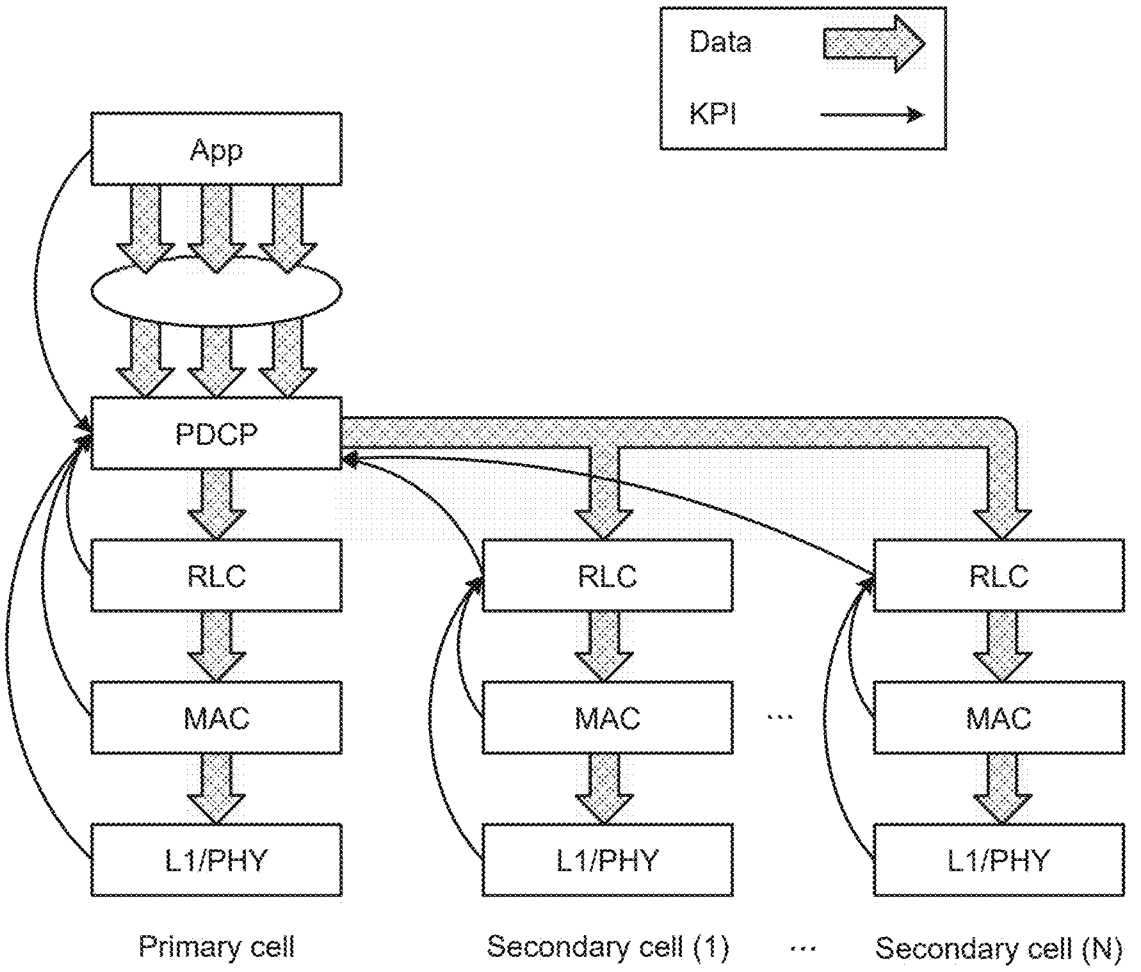
FIG. 14 is a diagram illustrating an operation of a communication system according to a first embodiment.

FIG. 14 is a diagram illustrating the operation of the communication system 1 according to a first embodiment. As described above, the communication system 1 includes the terminal device 40 in which the aggregate of the plurality of cells is set. The plurality of cells is bundled by, for example, dual connectivity or carrier aggregation.

The plurality of cells is formed by one or more base stations 30. In the first embodiment, as an example, one base station 30 forms one cell. The plurality of cells includes at least a primary cell managed by a first base station 30 and a secondary cell managed by a second base station 30. The first base station 30 is, for example, a 5G base station, and the second base station 30 is, for example, an LTE base station. It is apparent that the first base station and the second base station are not limited to this example. For example, both the first base station 30 and the second base station 30 may be 5G base stations.

A packet data convergence protocol (PDCP) layer, a radio link control (RLC) layer, a medium access control (MAC) layer, and an L1/PHY layer are disposed in the terminal device 40. In the example in FIG. 14, one PDCD layer is disposed in the terminal device 40, and a plurality of RLC layers, MAC layers, and L1 (layer 1)/PHY (physical) layers is disposed in the terminal device 40.

The terminal device 40 according to the present embodiment can bundle radio waves of the plurality of cells for communication. In the example in FIG. 14, the terminal device 40 can bundle the primary cell, and the secondary cell (1) to the secondary cell (N) for communication. Here, N is an arbitrary integer. As illustrated in FIG. 14, one RLC layer, one MAC layer, and one L1/PHY layer are associated with each cell. Note that the application layer may be disposed in the terminal device 40 or may be disposed in an external device (e.g., another terminal device 40) connected to the terminal device 40.

<4-1. Processing Executed by Communication Apparatus>

In the present embodiment, the terminal device 40 (or external device) executes the following processing.

(S1) First, the terminal device 40 (or external device) monitors a communication status of upstream communication in each layer (application layer, RLC layer, MAC layer, and L1/PHY layer). At this time, the terminal device 40 (or external device) may monitor the communication status focused on a key performance indicator (KPI) related to the delay time.

(S2) Then, the acquisition unit 431 of the terminal device 40 acquires a monitoring result (hereinafter also referred to as delay time information) of each layer (application layer, RLC layer, MAC layer, and L1/PHY layer). At this time, as illustrated in FIG. 14, the terminal device 40 may aggregate monitoring results of the respective layers into the PDCP layer. In the following description, the monitoring result is also referred to as the delay time information.

(S3) Then, the communication control unit 432 of the terminal device 40 evaluates a delay in the upstream communication for each cell based on the monitoring result (delay time information). Then, the communication control unit 432 of the terminal device 40 transfers data in order from the cell assumed to have the smallest delay. The processing of the communication control unit 432 is executed in the PDCP layer.

(S1: KPI Monitoring)

As described above, the terminal device 40 (or external device) monitors the communication status of the upstream communication in each layer. Information monitored in each layer is as follows:

(1) Layer 1 (PHY Layer)

Each PHY layer monitors a parameter described below in its own cell for a certain period of time. The parameter to be monitored is, for example, at least one of a block error ratio (BLER) for each modulation scheme or coding rate, the number of resource blocks, and a total amount of transmission data. In the following description, a parameter related to the delay time of the upstream transmission (delay time information) measured in the PHY layer may be referred to as a PHY parameter.

(2) Layer 2 (MAC Layer)

Each MAC layer monitors a parameter described below in its own cell for a certain period of time. The parameter to be monitored is, for example, at least one of an allocation interval of a new uplink resource (transmission slot, RB, MCS, etc.), a buffer residence time, and an allocation transport block size (TBS). In the following description, a parameter related to the delay time of the upstream transmission (delay time information) measured in the MAC layer may be referred to as a MAC parameter.

(3) Layer 2 (RLC Layer)

Each RLC layer monitors a parameter described below in its own cell for a certain period of time: In the case of RLC-acknowledged mode (RLC-AM), the parameter to be monitored is, for example, an ACK response time. Here, the ACK response time is time between a reception timing of the ACK and the most recent RLC PDU transmission timing corresponding to the ACK. Note that, in the case of RLC-unacknowledged mode/transparent mode (RLC-UM/TM), the RLC layer does not need to monitor the communication status. In the following description, a parameter related to the delay time of upstream transmission (delay time information) measured in the MRLC layer may be referred to as an RLC parameter.

(4) Application Layer

The application layer monitors a parameter described below for a certain period of time. The parameter to be monitored is, for example, end to end (E2E) delay information. Here, the E2E delay information is, for example, information on a delay time between the host application installed in the terminal device 40 or the external device and the host application installed in the server 10. Note that the E2E delay information may be a round trip time (RTT) between application layers. In the following description, a parameter related to the delay time of the upstream transmission (delay time information) measured in the application layer may be referred to as an APP parameter.

(S2: Aggregation of Monitoring Results)

As described above, the acquisition unit 431 of the terminal device 40 aggregates the monitoring results (delay time information) in each layer to the PDCP layer.

For the parameter (KPI) of the primary cell, for example, each layer may directly notify the PDCP layer of the parameter as illustrated in FIG. 14.

In addition, for the parameter (KPI) of the secondary cell, for example, each layer may temporarily aggregate the parameters to the RLC layer of the secondary cell and notify the PDCP of the primary cell of the aggregated parameters from the RLC layer as illustrated in FIG. 14.

When a plurality of cells is associated with one RLC layer and one MAC layer by carrier aggregation, the terminal device 40 may aggregate the parameters for each cell group. In other words, when the plurality of cells is associated with one RLC layer and one MAC layer in carrier aggregation, the terminal device 40 may acquire the delay time information by regarding a cell group formed by the plurality of cells as one cell.

(S3: Data Transfer)

As described above, the terminal device 40 evaluates the delay of the upstream communication in each cell based on the monitoring results. For example, the terminal device 40 ranks cells assumed to have the smallest delay based on the notified monitoring result (KPI), and calculates a transmission capacity of each of the plurality of cells. The transmission capacity is a maximum amount of data that can be transmitted in the layer 1 (PHY layer).

Then, the terminal device 40 transfers data in order from a cell assumed to have the smallest delay. For example, when the cells are ranked based on the monitoring results, the terminal device 40 first transfers the PDCP PDU to the cell with the best rank. At this time, the terminal device 40 transfers the PDCP PDU within a range in which the total transfer amount does not exceed the transmission capacity of the corresponding cell.

When the amount of transmission data exceeds the transmission capacity of the cell, the terminal device 40 determines whether the total delay time becomes shorter by waiting for the currently used cell to become available for transfer or whether the total delay time becomes shorter by using the next rank cell. At this time, the terminal device 40 estimates the total delay time in consideration of a data length (PDU size) and a data type. In other words, the terminal device 40 estimates the delay time "based on a congestion degree of cell" unique to the wireless communication.

When it is determined better to wait, the terminal device 40 does not use the next rank cell and waits until the currently used cell becomes available for transfer. On the other hand, when it is determined that it is better to transfer the PDCP PDU to the next rank cell, the terminal device 40 transfers the PDCP PDU to the cell. The terminal device 40 transfers the maximum amount of PDCP PDU within a range in which the total amount of transfer does not reach the transmission capacity of the corresponding cell.

When the process is repeated and there is no cell to transfer to, the terminal device 40 stops the process until there is a cell available for transfer.

Note that the terminal device 40 stores the total amount of data transferred from the PDCP layer to each RLC layer. Then, the terminal device 40 confirms the RLC status PDU (ACK) in the case of RLC-AM, and confirms the HARQ ACK in the case of RLC-UM/TM to complete the transmission. Then, the terminal device 40 subtracts a transmission amount from the data capacity.

Note that, when a plurality of cells is associated with one RLC layer and one MAC layer by carrier aggregation, the terminal device 40 performs ranking by regarding a cell group as one cell. In other words, the terminal device 40 ranks each cell group. At this time, a transfer destination of the PDCP PDU is a cell group.

<4-2. Sequence Example>

Figure 15:
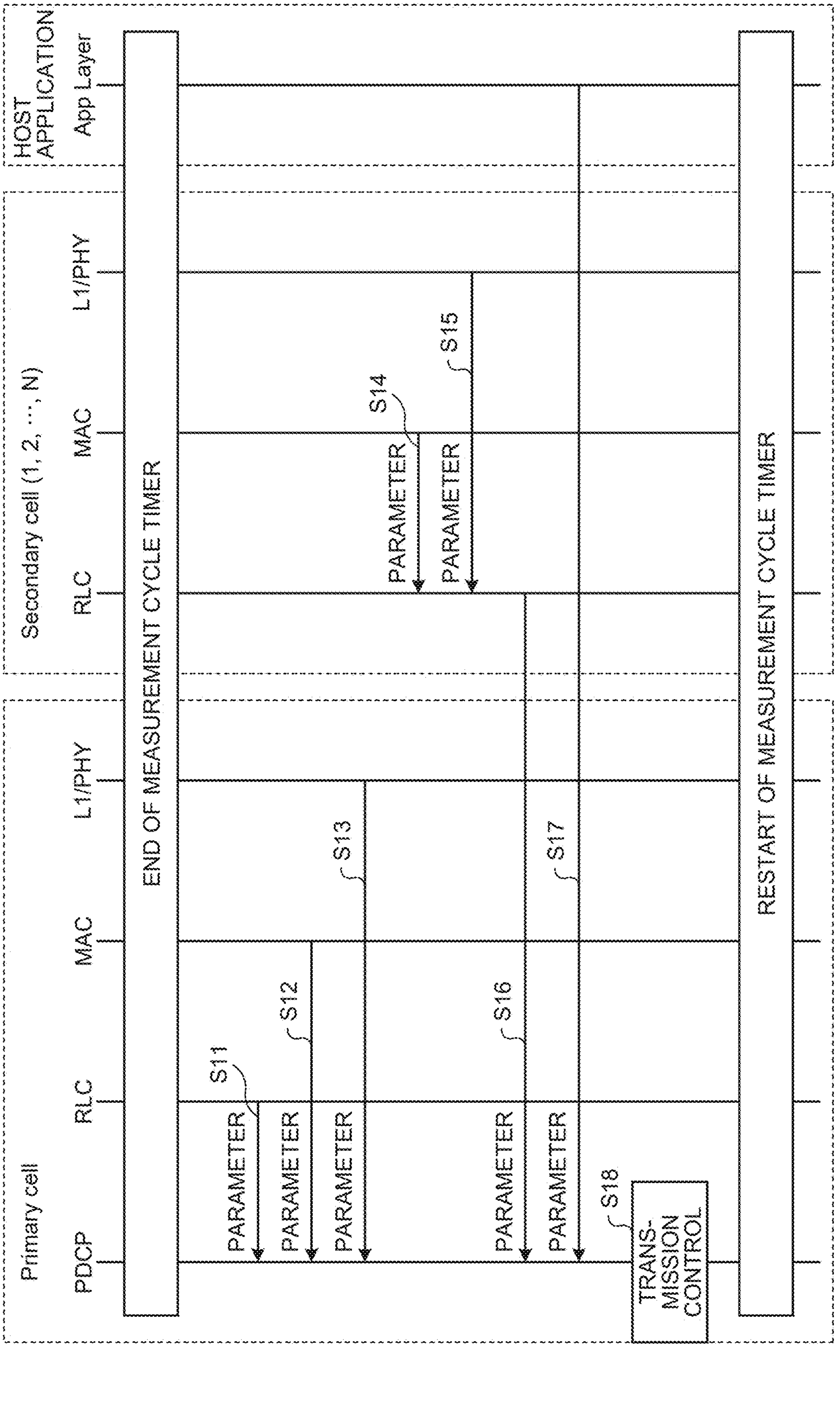
FIG. 15 is a sequence diagram illustrating an example of processing executed by a communication apparatus.

Next, a process executed by the communication apparatus (terminal device 40 or external device) will be described using a sequence diagram. FIG. 15 is a sequence diagram illustrating an example of the process executed by the communication apparatus.

In the example in FIG. 15, the primary cell and the secondary cell (1, 2, to N) are a plurality of bundled cells. The host application is an application installed in the communication apparatus (terminal device 40 or external device connected to terminal device 40). For example, the host application is an application on a smartphone. Note that the host application may be an electronic device connected to the smartphone.

First, the terminal device 40 (or external device) sets a cycle timer (hereinafter referred to as a measurement cycle timer) used to measure the delay time information of the upstream transmission. The measurement cycle timer may be the same in a plurality of layers or may be different in the plurality of layers. At this time, the measurement cycle timer may be configured to start or restart when a layer is set, changed, or deleted.

Each layer (application layer, RLC layer, MAC layer, and L1/PHY layer) associated with each cell (primary cell and secondary cell (1) to secondary cell (N)) measures the delay time information of the upstream transmission when the measurement cycle timer is started. Each layer accumulates measurement results as a parameter. Then, when the measurement cycle timer ends, each layer aggregates the parameters accumulated from the start of the measurement cycle timer to the end of the measurement cycle timer to the PDCD layer of the primary cell.

For example, the RLC layer associated with the primary cell transmits the RLC parameters accumulated between the start and the end of the measurement cycle timer to the PDCD layer associated with the primary cell (Step S11). Here, when an RLC mode is an acknowledged mode (AM), the RLC parameter is, for example, the ACK response time. Note that the RLC parameter may be information on an average value calculated based on the accumulated information. For example, the ACK response time as the RLC parameter may be an average ACK response time from the start to the end of the measurement cycle timer.

In addition, the MAC layer associated with the primary cell transmits the MAC parameters accumulated during the period from the start of the measurement cycle timer until the end of the measurement cycle timer to the PDCD layer associated with the primary cell (Step S12). Here, the MAC parameters are, for example, a new uplink allocation interval, a buffer residence time, and an allocation transport block size (TBS). Note that the MAC parameters may be information on an average value calculated based on the accumulated information. For example, the new uplink allocation interval as the MAC parameter may be an average new uplink allocation interval from the start to the end of the measurement cycle timer. The buffer residence time as the MAC parameter may be an average buffer residence time from the start to the end of the measurement cycle timer. In addition, the allocation TBS as the MAC parameter may be an average allocation TBS from the start to the end of the measurement cycle timer.

In addition, the L1/PHY layer associated with the primary cell transmits the PHY parameters accumulated from the start of the measurement cycle timer to the end of the measurement cycle timer to the PDCD layer associated with the primary cell (Step S13). Here, the PHY parameter is, for example, a block error ratio (BLER) for each modulation scheme or coding rate and the total amount of transmission data. The PHY parameter may be information on an average value calculated based on the accumulated information. For example, the BLER for each modulation scheme or each coding rate as the PHY parameter may be an average BLER for each modulation scheme or each coding rate.

In addition, the MAC layer associated with the secondary cell transmits the MAC parameters accumulated during a period from the start of the measurement cycle timer to the end of the measurement cycle timer to the RLC layer associated with the secondary cell (Step S14). Here, the MAC parameters are, for example, the new uplink allocation interval, the buffer residence time, and the allocation transport block size (TBS). Note that the MAC parameters may be information on an average value calculated based on the accumulated information. For example, the new uplink allocation interval as the MAC parameter may be an average new uplink allocation interval from the start to the end of the measurement cycle timer. The buffer residence time as the MAC parameter may be an average buffer residence time from the start to the end of the measurement cycle timer. In addition, the allocation TBS as the MAC parameter may be an average allocation TBS from the start to the end of the measurement cycle timer.

In addition, the L1/PHY layer associated with the secondary cell transmits the PHY parameters accumulated from the start of the measurement cycle timer to the end of the measurement cycle timer to the RLC associated with the secondary cell (Step S15). Here, the PHY parameter is, for example, a block error ratio (BLER) for each modulation scheme or coding rate and the total amount of transmission data. The PHY parameter may be information on an average value calculated based on the accumulated information. For example, the BLER for each modulation scheme or each coding rate as the PHY parameter may be an average BLER for each modulation scheme or each coding rate.

In addition, the RLC layer associated with the secondary cell transmits the MAC parameter and the PHY parameter acquired in Steps S14 and S15 and the RLC parameter accumulated during a period from the start to the end of the measurement cycle timer to the PDCD layer associated with the primary cell (Step S16). Here, when the RLC mode is the acknowledged mode (AM), the RLC parameter is, for example, the ACK response time. Note that the RLC parameter may be information on an average value calculated based on the accumulated information. For example, the ACK response time as the RLC parameter may be an average ACK response time from the start to the end of the measurement cycle timer.

In addition, the application layer transmits the APP parameters accumulated during a period from the start to the end of the measurement cycle timer to the PDCD layer associated with the primary cell (Step S17). Here, for example, the APP parameter is the E2E delay information. Here, the E2E delay information may be a round trip time (RTT) between the application layers. Note that the APP parameter may be information on an average value calculated based on the accumulated information. For example, the RTT as the APP parameter may be an average RTT from the start to the end of the measurement cycle timer.

The PDCD layer associated with the primary cell starts a transmission control process of the PDCP PDU based on the aggregated parameter (Step S18). A PDCP PDU transmission control process will be described later.

Then, the terminal device 40 (or external device) restarts the measurement cycle timer and restarts the accumulation of parameters.

<4-3. PDCP PDU Transmission Control Process>

Figure 16:
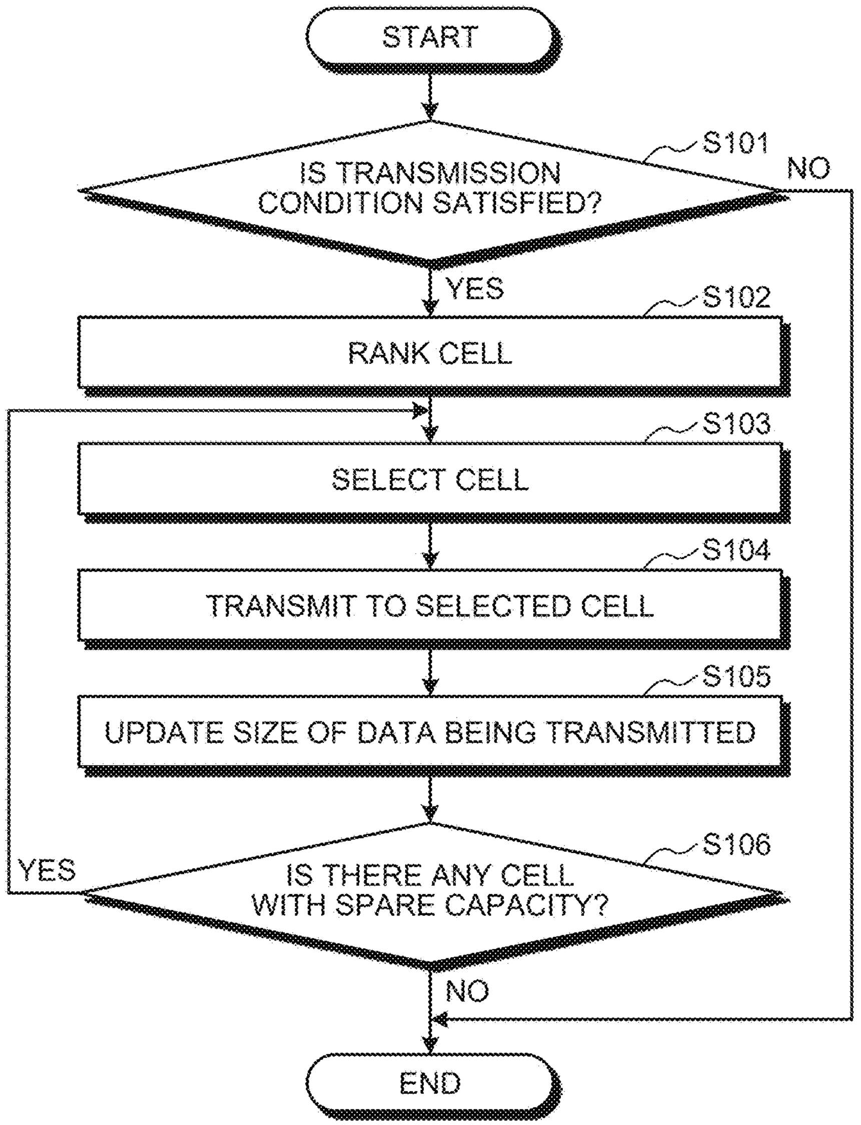
FIG. 16 is a flowchart illustrating an example of a PDCP PDU transmission control process.

Next, the PDCP PDU transmission control process will be described. FIG. 16 is a flowchart illustrating an example of the PDCP PDU transmission control process. The transmission control process is executed, for example, in the PDCD layer (e.g., communication control unit 432 of the terminal device 40) associated with the primary cell. In the following description, the PDCD layer associated with the primary cell is simply referred to as the PDCD layer.

First, the PDCD layer determines whether a transmission start condition (hereinafter referred to as a transmission condition) using the plurality of cells is satisfied (Step S101). At this time, the transmission condition may be a condition given from the upper layer. When the transmission condition is not satisfied (Step S101: No), the transmission control process ends.

When the transmission condition is satisfied (Step S101: Yes), the PDCD layer ranks the cells (Step S102). The PDCD layer calculates a cell rank coefficient for each cell based on the latest information notified from each layer (MAC layer, RLC layer, and application layer). Here, a cell rank coefficient R is a value indicating the congestion degree of cell (rotation rate of the buffer) and a communication path state, and is, for example, a value calculated by Formula (1) below. Here, the smaller the value of the cell rank coefficient, the higher the rank.

$$R=k_1\times T_{buff}/T_{MAC}+k_2\times T_{RLC}+k_3\times T_{APP} \quad (1)$$

Here, $T_{buff}$ is buffer residence time (average buffer residence time) in the MAC layer. In addition, $T_{MAC}$ is a new uplink allocation interval (average new uplink allocation interval) in the MAC layer. Here, $T_{buff}/T_{MAC}$ indicates the rotation rate of the data in the MAC buffer. $T_{RLC}$ is the ACK response time (average ACK response time) in the MAC layer. $T_{APP}$ is the RTT (average RTT) in the application layer. Note that $k_1$, $k_2$ [1/sec], and $k_3$ [1/sec] are weighting coefficients. These weighting coefficients may be separately determined based on priority items considered by an operator.

Next, the PDCD layer selects a cell to be used for transmission (Step S103). At this time, the PDCD layer compares the size of data being transmitted with the transmission capacity of the cell, and selects the highest rank cell having spare capacity. Here, "having spare capacity by comparing the size of data being transmitted with the transmission capacity" may be a case where Formula (2) below is satisfied.

$$DS>PS \quad (2)$$

Here, DS is the size of data being transmitted, and PS is the PDCP PDU size to be transmitted.

Note that the PDCD layer calculates the transmission capacity of the cell from the layer 1 information (PHY parameter) for each cell. At this time, the PDCD layer calculates the transmission capacity based on the latest information notified from each layer. The transmission capacity of the cell is, for example, a value obtained by multiplying a smaller one of (A) and (B) below by both (1-BLER) and a spare capacity coefficient $k_4$ (<1.0).

(A) Total transport block size (TBS) obtained from a total resource brock (RB) number and an average modulation and coding scheme (MCS)

(B) Total TBS actually transmitted

Next, the PDCD layer transmits the PDCP PDU to the cell selected in Step S103 (Step S104).

Then, the PDCD layer updates the size of data being transmitted of the cell selected in Step S103 (Step S105). For example, the PDCD layer updates the size of data being transmitted as in Formula (3) below at the time of a first process after initialization. On the other hand, the PDCD layer is updated as in Formula (4) below at the time of second and subsequent processes after initialization.

$$DS=TC-PS \quad (3)$$

$$DS=DS-PS \quad (4)$$

Here, the DS is the size of data being transmitted, TC is the transmission capacity, and PS is the PDCP PDU size to be transmitted. Note that the initialization timing may be a timing at which setting, change, or deletion of the application layer, the PDCP layer, the RLC layer, the MAC layer, or the PHY layer is performed.

Next, the PDCD layer determines whether there is a cell with spare capacity for transmission (Step S106). When there is a cell with spare capacity for transmission (Step S106: Yes), the PDCD layer returns the process to Step S103. When there is no cell with spare capacity for transmission (Step S106: No), the PDCD layer ends the transmission control process.

<4-4. RTT Measurement Method Considering Passing Cell>

In the above-described embodiment, the application layer acquires the round trip time (RTT) as the parameter (APP parameter) indicating a communication environment of each cell. In order to use the RTT for transmission control of the PDCP PDU, it is necessary to measure the RTT while considering which cell does data (packet) transmitted from the application layer pass through. However, since the data (packet) transmitted from the application layer is distributed to each cell in the PDCD layer, it is difficult to perform the RTT measurement, in the application layer, in consideration of the passing cell. Therefore, an example of an RTT measurement method in consideration of the passing cell will be described below.

Figure 17:
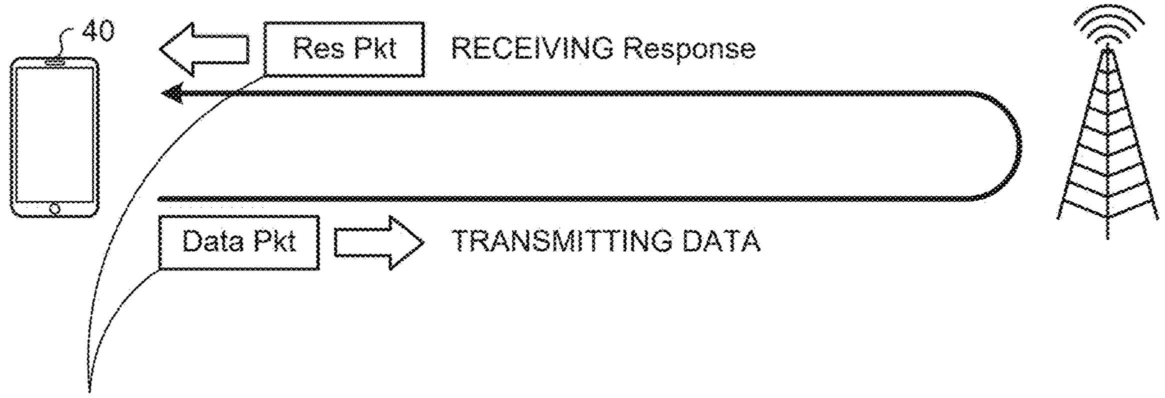
FIG. 17 is a diagram illustrating a method of measuring an RTT according to the present embodiment.

FIG. 17 is a diagram illustrating a method of measuring the RTT according to the present embodiment. The RTT measurement generally needs to be associated with a transmission packet and a response packet (e.g., echo/ACK, etc.). In the present embodiment, the transmission packet and the response packet are associated by using a sequence number. For example, the sequence number may be recorded in a header of the packet. Note that the association information is not limited to the sequence number.

Figure 18:
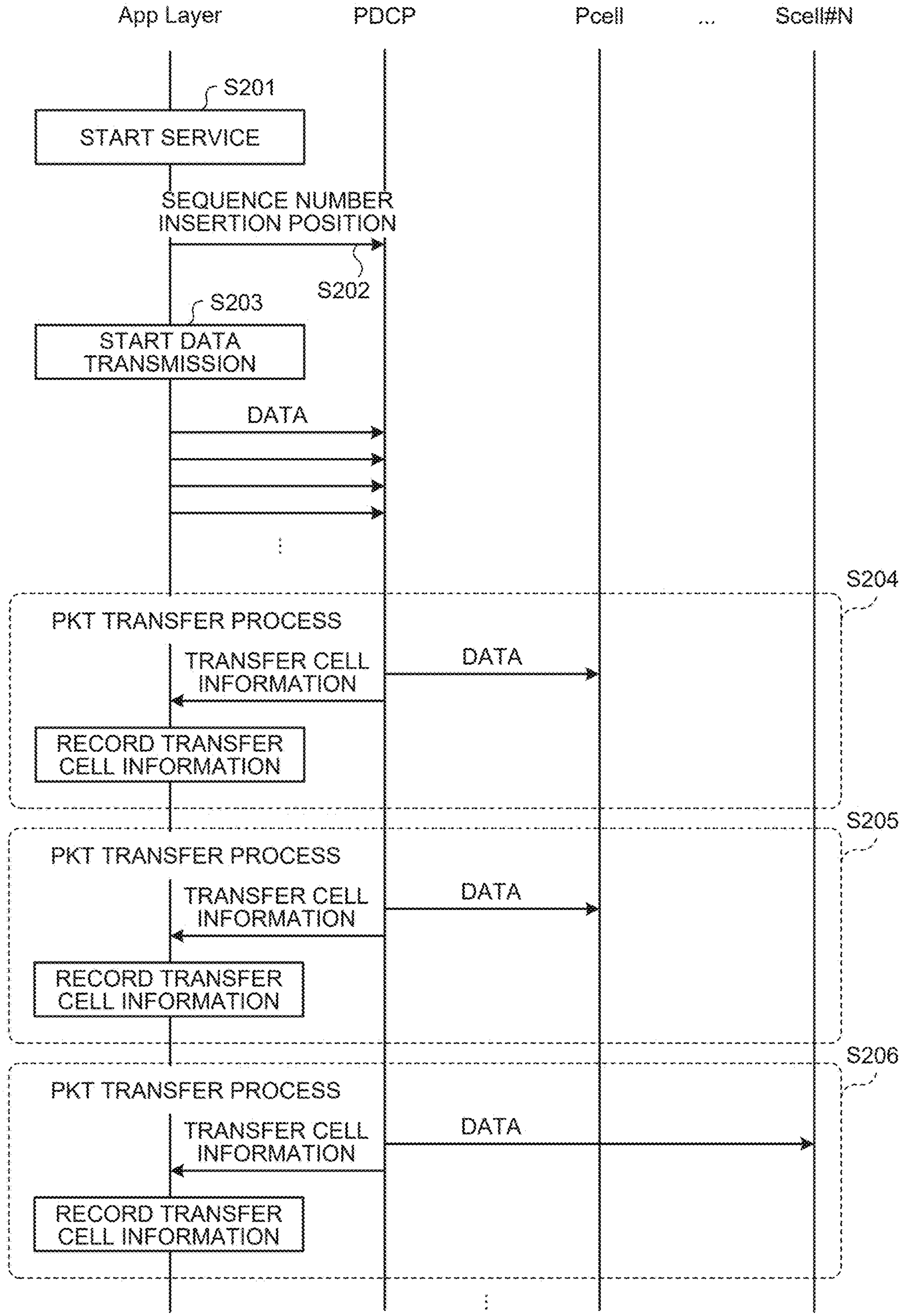
FIG. 18 is a sequence diagram illustrating an RTT measurement process according to the present embodiment.
Figure 19:
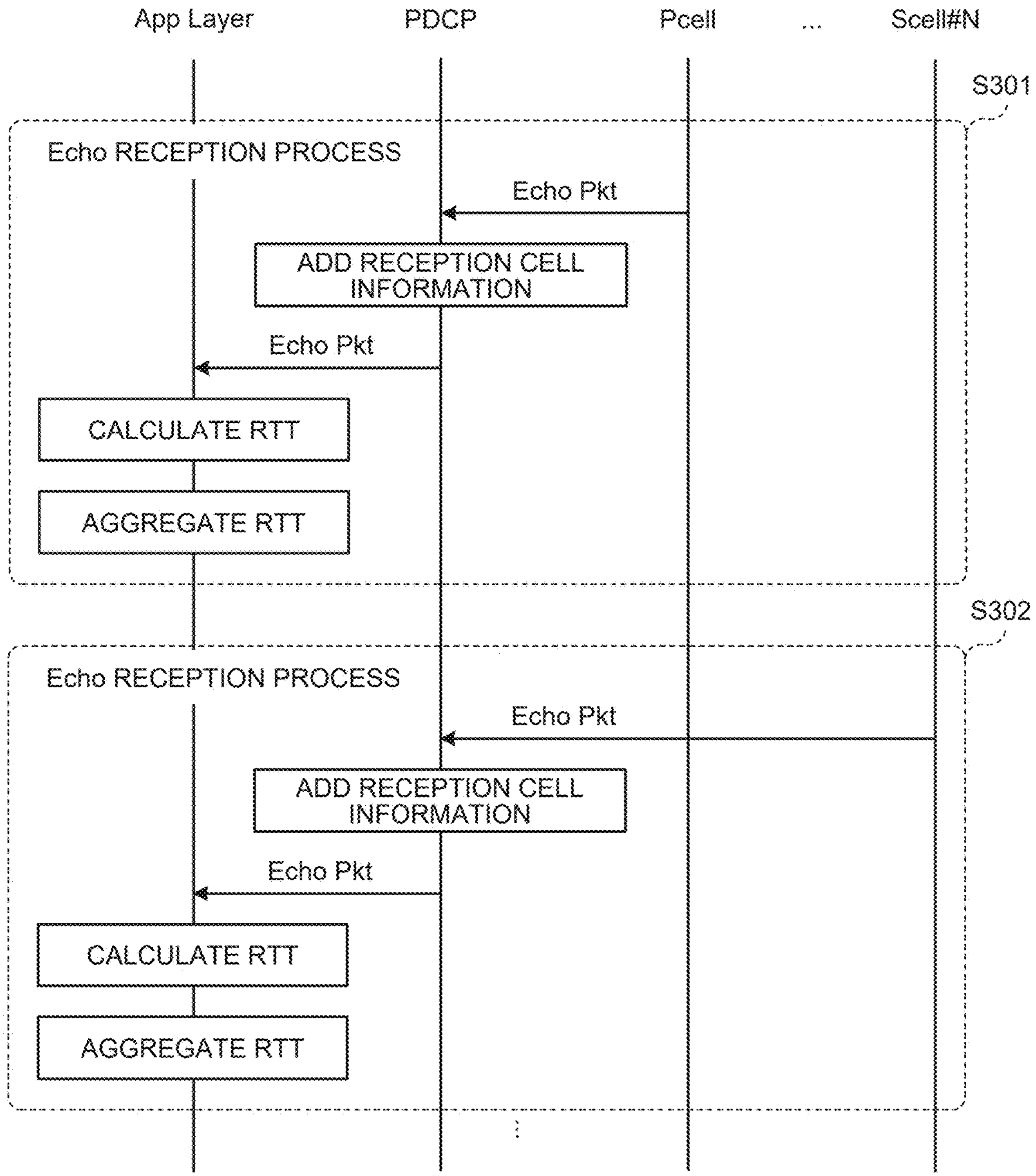
FIG. 19 is a sequence diagram illustrating the RTT measurement process according to the present embodiment.

FIGS. 18 and 19 are sequence diagrams illustrating an RTT measurement process according to the present embodiment. FIG. 18 is a sequence diagram illustrating a packet transmission process, and FIG. 19 is a sequence diagram illustrating a response packet reception process.

In the examples illustrated in FIGS. 18 and 19, the transmission device (device that transmits a transmission packet) is, for example, the terminal device 40, and the reception device (device that transmits a response packet) is, for example, the server 10. The processes illustrated in FIGS. 18 and 19 are executed, for example, by the terminal device 40. When the external device connected to the terminal device 40 functions as the host application, the process of the application layer may be executed by the external device. Note that the following process is also applicable to a case where the transmission device is the server 10 and the reception device is the terminal device 40.

First, the packet transmission process will be described with reference to FIG. 18.

First, the application layer starts a process related to a service provided to the user by the host application (Step S201). Then, the application layer notifies the insertion position of the sequence number and size information so that the sequence number of each packet (transmission packet and response packet) can be obtained in the PDCP layer (Step S202). At this time, the application layer notifies the insertion position of the sequence number and size information for both the transmission packet and the response packet.

When a data transmission demand is generated in the host application, the application layer starts data transmission to the PDCP layer (Step S203).

When data is received from the application layer, the PDCP layer executes the packet transfer process (Steps S204 to S206). At this time, the PDCP layer may perform the transmission control process illustrated in FIG. 16. For example, the PDCP layer selects a cell to be used for data transmission (Steps S102 to S103 illustrated in FIG. 16) and transfers data (packet) to the selected cell (Step S104 illustrated in FIG. 16). At this time, the PDCP layer notifies the application layer of information indicating which packet has been transferred to which cell (hereinafter referred to as transfer cell information). The transfer cell information is, for example, information in which the sequence number of the transfer packet is associated with information for identifying a cell used for transfer. Note that the PDCP layer may notify the application layer of the transfer cell information collectively in a plurality of packets or collectively at regular time intervals. The application layer records the transfer cell information notified from the PDCP layer in the storage unit.

Next, the response packet reception process will be described with reference to FIG. 19.

First, when the response packet is received from the reception device, the PDCP layer and the application layer of the transmission device execute an echo reception process (Steps S301 to S302). For example, when receiving the response packet, the PDCP layer adds information indicating from which cell the response packet has been received (hereinafter referred to as received cell information) to the response packet. The PDCP layer transfers the response packet, to which the received cell information is added, to the application layer. The application layer calculates the RTT by matching sequence numbers of the transmission packet and the response packet. Then, the application layer aggregates the RTTs for each passing cell.

Note that the application layer may determine the passing cell as follows.

(1) When the transmission packet and the response packet pass through the same cell, the application layer sets the cell as the passing cell.

(2) When the transmission packet and the response packet pass through different cells, the application layer determines the passing cell by one of the following methods.

(Method 1) Since the size of the response packet is small and an influence on the RTT is small, a cell used at the time of transmission is regarded as a passing cell.

(Method 2) The passing cell is not determined. In other words, when the transmission packet and the response packet pass through different cells, the application layer does not aggregate the RTTs.

(Method 3) The passing cell is determined by comparison with another RTT having the same combination of the cell at the time of transmission and the cell at the time of reception.

<4-5. Effects>

According to the present embodiment, since the terminal device 40 selects the cell with the lowest delay based on the monitoring results regarding the delay of the upstream transmission and transmits data, the low delay communication can be realized even when radio waves of the plurality of cells are bundled to perform communication. In addition, even when the amount of data exceeding the transmission capacity of the selected cell is transmitted, the terminal device 40 transmits the data in consideration of whether it is better to wait for the selected cell to become available for transfer or whether it is better to use a cell with the second lowest delay. As a result, it is possible to reduce the occurrence frequency of latency on the reception side.

5. Second Embodiment

In the first embodiment, the terminal device 40 in which the aggregate of the plurality of cells is set selects a cell or the like. However, the processing according to the first embodiment is also applicable to a MAC scheduler of the base station 30. Generally, information available in the base station 30 is limited to information in a radio access network (PAN), but the E2E RTT of the application layer can be notified from a computer outside a mobile network (server or client) through a network exposure function (NEF) or a service capability exposure function (SCEF) of a core network (e.g., management apparatus 20). In the second embodiment, the base station 30 controls data transmission, based on the E2E RTT from the computer outside the mobile network, to the terminal device 40 in which the aggregate of the plurality of cells is set.

In the following description, the computer outside the mobile network is assumed to be the server 10 as an example, but the computer outside the mobile network is not limited thereto and may be a client terminal. At this time, a configuration of the client terminal may be similar to that of the terminal device 40. In the following description, it is assumed that the management apparatus 20 has a function of a core network.

Figure 20:
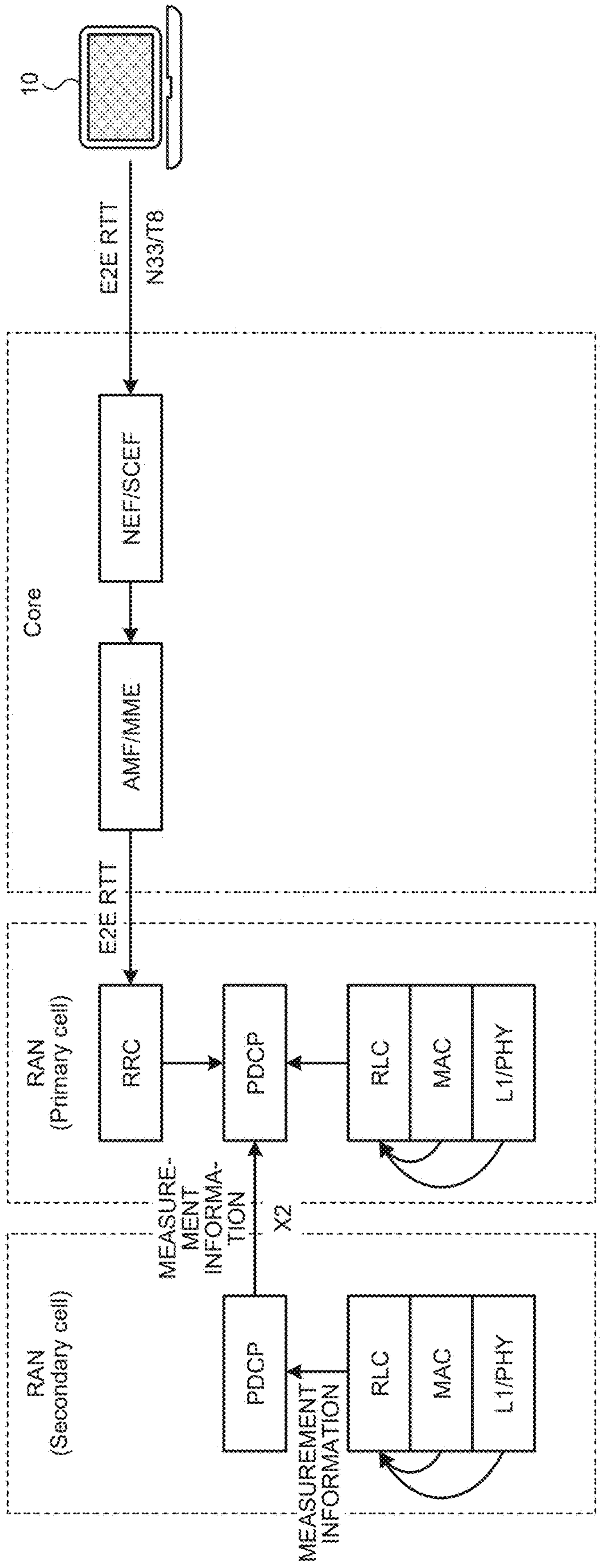
FIG. 20 is a diagram illustrating an operation of a communication system according to a second embodiment.

FIG. 20 is a diagram illustrating the operation of the communication system 1 according to the second embodiment. As described above, the communication system 1 includes the terminal device 40 in which the aggregate of the plurality of cells is set. In the second embodiment, the plurality of cells is bundled by dual connectivity. The plurality of cells is formed by one or more base stations 30. In the second embodiment, as an example, one base station 30 forms one cell. In the example in FIG. 20, the primary cell and the secondary cell are formed by a plurality of base stations 30. Although only one secondary cell is illustrated in the example in FIG. 20, there may be a plurality of secondary cells.

The base stations 30 forming the primary cell are connected, for example, to the base stations 30 forming the secondary cell as illustrated in FIG. 1. The base stations 30 forming the primary cell can directly transfer data to the terminal device 40, or can transfer data via the base stations 30 forming the secondary cell.

Each of the plurality of base stations 30 has the PDCP layer, the RLC layer, the MAC layer, and the L1/PHY layer. In addition, the radio resource control (RRC) layer is disposed in the base stations 30 forming the primary cell. In addition, the core network (e.g., management apparatus 20) includes an access and mobility management function (AMF), a mobility management entity (MME), a network exposure function (NEF), and a service capability exposure function (SCEF) as control plane functions. Note that, in the example in FIG. 20, the application layer is arranged in the server 10.

<5-1. Process Executed by Communication Apparatus>

In the present embodiment, the server 10, the management apparatus 20, and the base station 30 execute the following process.

(S1) First, the server 10 and the base station 30 monitor the communication status in each layer (application layer, RLC layer, MAC layer, and L1/PHY layer). Information to be monitored may be similar to that in the first embodiment.

For example, the application layer of the server 10 may obtain the E2E RTT with the application layer of the terminal device 40.

(S2) Then, the base stations 30 forming the primary cell acquire a monitoring result (hereinafter also referred to as measurement information or delay time information) of each layer (application layer, RLC layer, MAC layer, and L1/PHY layer). At this time, as illustrated in FIG. 20, the base station 30 aggregates the monitoring results in the layers to the PDCP layer of the base station 30 forming the primary cell.

For example, regarding the measurement information (parameter) of the primary cell, each layer temporarily aggregates the parameter in the RLC layer of the primary cell as illustrated in FIG. 20. The RLC layer sends the aggregated parameters to the PDCP layer. Similarly to the first embodiment, each layer may directly transmit the parameter to the PDCP layer without passing through the RLC layer.

For the measurement information (parameter) of the secondary cell, for example, each layer once aggregates the parameters to the RLC layer of the secondary cell as illustrated in FIG. 20. The RLC layer sends the aggregated parameters to the PDCP layer. The PDCP layer sends the parameter to the PDCP layer of the primary cell by using the X2 interface.

Note that the server 10 according to the second embodiment is located outside the mobile network. Therefore, the application layer of the server 10 notifies the measurement information (e.g., E2E RTT) to the PDCP layer of the primary cell via the exposure function defined in the mobile network. For example, the application layer of the server 10 sends the measurement information to NEF/SCEF of the core network (management apparatus 20) via an N33/T8 interface. The AMF/MME in the core network (management apparatus 20) sends the measurement information sent to the NEF/SCEF to the RRC layer of the primary cell. The RRC layer of the primary cell sends the obtained measurement information to the PDCP layer.

When the plurality of cells is associated with one RLC layer and one MAC layer by carrier aggregation, the base station 30 may aggregate the parameters for each cell group. In other words, when the plurality of cells is associated with one RLC layer and one MAC layer by carrier aggregation, the base station 30 may acquire the delay time information by regarding a cell group formed by the plurality of cells as one cell.

(S3) Then, the PDCP layer of the primary cell performs evaluation regarding the communication delay for each cell based on the monitoring results (delay time information). Then, the PDCP layer of the primary cell transfers data in order from the cell assumed to have the smallest delay.

As described above, the base stations 30 forming the primary cell can directly transfer data to the terminal device 40, or can transfer data via the base stations 30 forming the secondary cell. When it is evaluated that the delay of the primary cell is the smallest, the PDCP layer of the primary cell transfers data from the base stations 30 forming the primary cell to the terminal device 40. When it is evaluated that the delay of the secondary cell is the smallest, the PDCP layer of the primary cell forwards the data to the terminal device 40 via the base stations 30 forming the secondary cell.

<5-2. Sequence Example>

Figure 21:
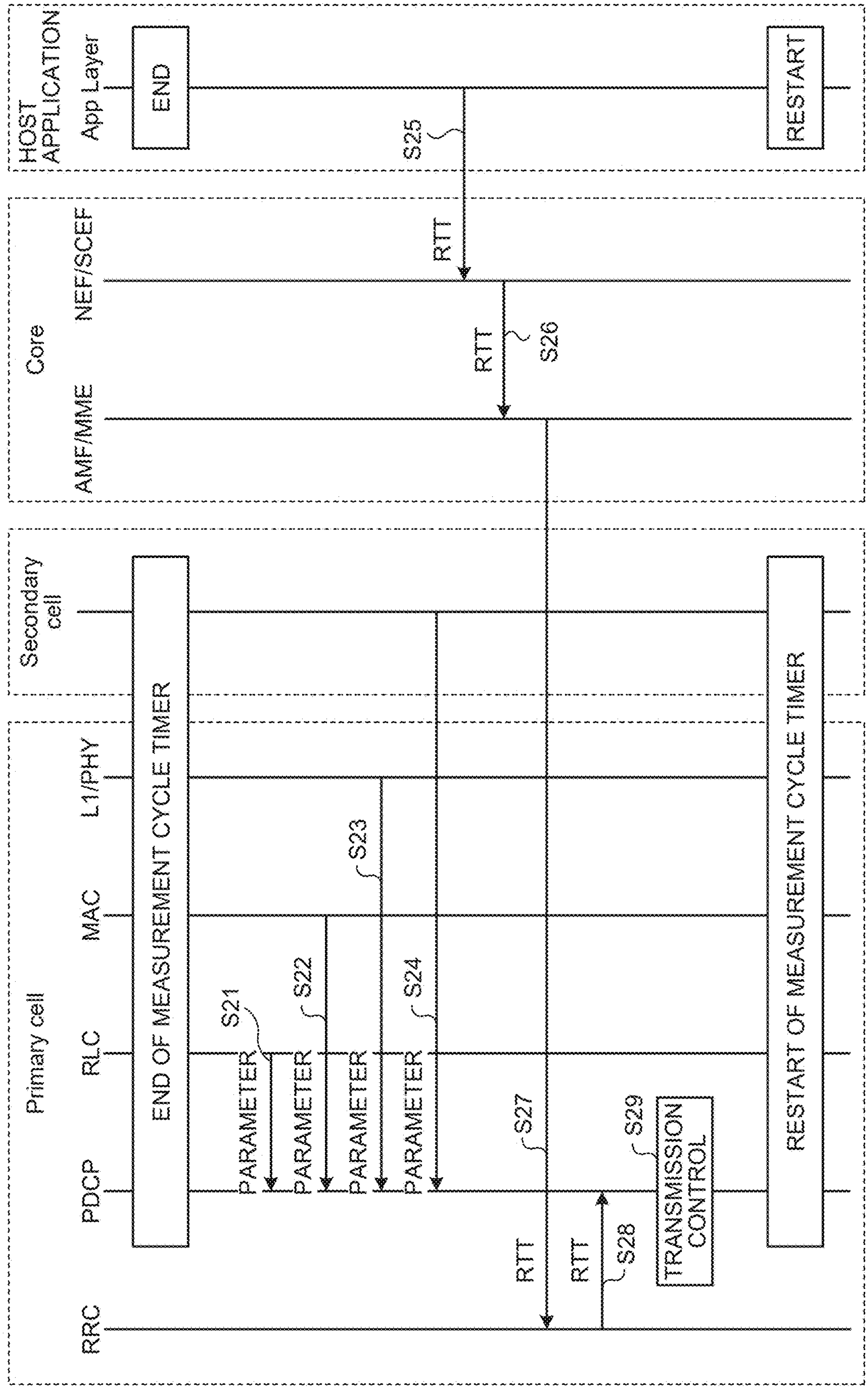
FIG. 21 is a sequence diagram illustrating an example of processing executed by a communication apparatus.

Next, the process executed by the communication apparatus (server 10, management apparatus 20, and base station 30) will be described using a sequence diagram. FIG. 21 is a sequence diagram illustrating an example of the process executed by the communication apparatus.

In the example in FIG. 21, the primary cell and the secondary cell indicate a plurality of bundled cells. There may be a plurality of secondary cells. In the present embodiment, one base station 30 forms one cell. In the present embodiment, the core network is the management apparatus 20. The host application is an application installed in the communication apparatus (e.g., server 10). Note that the host application may be an application on a smartphone. The host application may be an electronic device connected to a smartphone.

First, each communication apparatus (server 10 and base station 30) sets a cycle timer (hereinafter referred to as a measurement cycle timer) used to measure delay time information of the upstream transmission. The measurement cycle timer may be the same in a plurality of layers or may be different in the plurality of layers. At this time, the measurement cycle timer may be configured to start or restart when the layer is set, changed, or deleted.

When the measurement cycle timer is started, each layer (application layer, RLC layer, MAC layer, and L1/PHY layer) measures information related to the delay time of communication between the server 10 and the terminal device 40. Each layer accumulates measurement results as a parameter. Then, when the measurement cycle timer ends, each layer aggregates the parameters accumulated from the start of the measurement cycle timer to the end of the measurement cycle timer to the PDCD layer of the primary cell.

For example, the RLC layer of the primary cell transmits the RLC parameters accumulated from the start to the end of the measurement cycle timer to the PDCD layer of the primary cell (Step S21). Here, when the RLC mode is the acknowledged mode (AM), the RLC parameter is, for example, the ACK response time. Note that the RLC parameter may be information on an average value calculated based on the accumulated information. For example, the ACK response time as the RLC parameter may be an average ACK response time from the start to the end of the measurement cycle timer.

In addition, the MAC layer of the primary cell transmits the MAC parameters accumulated during a period from the start of the measurement cycle timer to the end of the measurement cycle timer to the PDCD layer of the primary cell (Step S22). Here, the MAC parameters are, for example, the new uplink allocation interval, the buffer residence time, and the allocation transport block size (TBS). Note that the MAC parameters may be information on an average value calculated based on the accumulated information. For example, the new uplink allocation interval as the MAC parameter may be an average new uplink allocation interval from the start to the end of the measurement cycle timer. The buffer residence time as the MAC parameter may be an average buffer residence time from the start to the end of the measurement cycle timer. In addition, the allocation TBS as the MAC parameter may be an average allocation TBS from the start to the end of the measurement cycle timer.

In addition, the L1/PHY layer of the primary cell transmits the PHY parameters accumulated from the start of the measurement cycle timer to the end of the measurement cycle timer to the PDCD layer of the primary cell (Step S23). Here, the PHY parameter is, for example, a block error ratio (BLER) for each modulation scheme or coding rate and the total amount of transmission data. The PHY parameter may be information on an average value calculated based on the accumulated information. For example, the BLER for each modulation scheme or each coding rate as the PHY parameter may be an average BLER for each modulation scheme or each coding rate.

In addition, the MAC layer of the secondary cell transmits, to the RLC layer of the secondary cell, the MAC parameters accumulated during a period from the start of the measurement cycle timer to the end of the measurement cycle timer. In addition, the L1/PHY layer of the secondary cell transmits, to the RLC of the secondary cell, the PHY parameters accumulated during a period from the start of the measurement cycle timer to the end of the measurement cycle timer. In addition, the RLC layer of the secondary cell transmits the MAC parameter, to the PDCD layer of the primary cell, the PHY parameters and the RLC parameters accumulated during a period from the start to the end of the measurement cycle timer (Step S24).

In addition, the application layer transmits, to the NEF/SCEF of the core network, the APP parameters accumulated during a period from the start to the end of the measurement cycle timer (Step S25). Here, the APP parameter is, for example, the RTT of the E2E. Note that the APP parameter may be information on an average value calculated based on the accumulated information. For example, the RTT as the APP parameter may be an average RTT from the start to the end of the measurement cycle timer.

The NEF/SCEF of the core network sends the APP parameter to the AMF/MME (Step S26). Then, the AMF/MME of the core network transmits the APP parameter to the RRC layer of the primary cell (Step S27). Then, the RRC layer of the primary cell transmits the APP parameter to the PDCP layer of the primary cell (Step S28).

The PDCD layer of the primary cell starts the transmission control process of the PDCP PDU based on the parameters aggregated (Step S29). The transmission control process of the PDCP PDU may be similar to the process illustrated in FIG. 16.

Then, each communication apparatus (server 10 and base station 30) restarts the measurement cycle timer and restarts the accumulation of parameters.

<5-3. Effects>

According to the present embodiment, since the base station 30 selects the cell with the lowest delay based on the monitoring results regarding the transmission delay and transmits data to the terminal device 40, the low delay communication can be realized even when radio waves of the plurality of cells are bundled to perform communication.

6. Third Embodiment

In the second embodiment, a plurality of cells is bundled by dual connectivity, but the process according to the second embodiment is also applicable to a case where the plurality of cells is bundled by carrier aggregation. Therefore, in the third embodiment, the process according to the second embodiment is applied to a carrier aggregation process. In the third embodiment, since the carrier aggregation process is performed, the measurement information is aggregated not in the PDCP layer but in the MAC layer.

Figure 22:
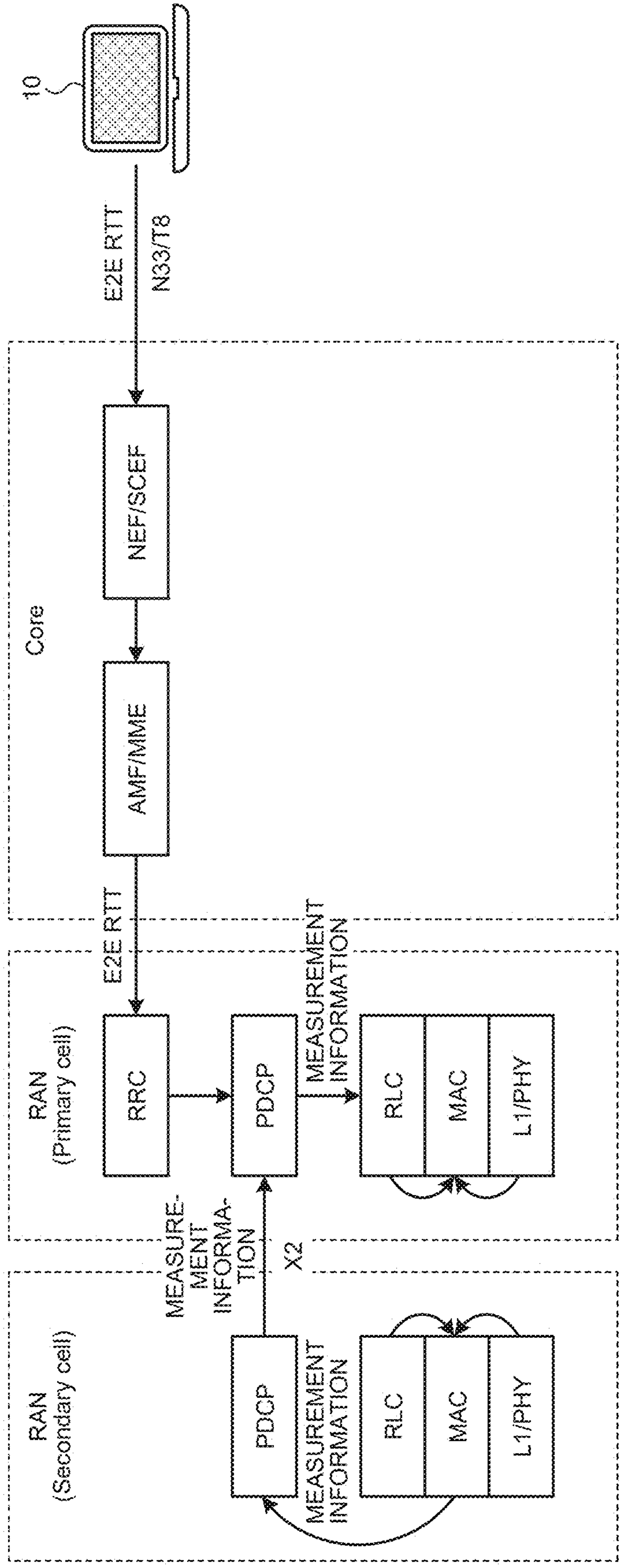
FIG. 22 is a diagram illustrating an operation of a communication system according to a third embodiment.

FIG. 22 is a diagram illustrating the operation of the communication system 1 according to the third embodiment. As described above, the communication system 1 includes the terminal device 40 in which the aggregate of the plurality of cells is set. In the third embodiment, the plurality of cells is bundled by carrier aggregation. The plurality of cells is formed by one or more base stations 30. In the second embodiment, as an example, one base station 30 forms one cell. In an example in FIG. 22, the primary cell and the secondary cell are formed by a plurality of base stations 30. Although only one secondary cell is illustrated in the example in FIG. 22, there may be a plurality of secondary cells.

The base stations 30 forming the primary cell are connected, for example, to the base stations 30 forming the secondary cell as illustrated in FIG. 1. The base stations 30 forming the primary cell can directly transfer data to the terminal device 40, or can transfer data via the base stations 30 forming the secondary cell.

Each of the plurality of base stations 30 has the PDCP layer, the RLC layer, the MAC layer, and the L1/PHY layer. In addition, the RRC layer is arranged in the base stations 30 forming the primary cell. In addition, the core network (e.g., management apparatus 20) includes AMF, MME, NEF, and SCEF as control plane functions. Note that, in the example in FIG. 22, the application layer is arranged in the server 10.

<6-1. Process Executed by Communication Apparatus>

In the present embodiment, the server 10, the management apparatus 20, and the base station 30 execute the following process.

(S1) First, the server 10 and the base station 30 monitor the communication status in each layer (application layer, RLC layer, MAC layer, and L1/PHY layer). Information to be monitored may be similar to that in the first embodiment. For example, the application layer of the server 10 may obtain the E2E RTT with the application layer of the terminal device 40.

(S2) Then, the base stations 30 forming the primary cell acquire a monitoring result (hereinafter also referred to as measurement information or delay time information) of each layer (application layer, RLC layer, MAC layer, and L1/PHY layer). At this time, as illustrated in FIG. 22, the base station 30 aggregates the monitoring results in the layers to the MAC layer of the base station 30 forming the primary cell.

For example, for the measurement information (parameter) of the primary cell, each layer aggregates the parameters to the MAC layer of the primary cell as illustrated in FIG. 20.

Further, for example, for the measurement information (parameter) of the secondary cell, each layer temporarily aggregates the parameters to the MAC layer of the secondary cell as illustrated in FIG. 20. The MAC layer sends the aggregated parameters to the PDCP layer. The PDCP layer sends the parameter to the PDCP layer of the primary cell by using the X2 interface. The PDCP layer of the primary cell sends the measurement information from the secondary cell to the MAC layer.

Note that the server 10 according to the second embodiment is located outside the mobile network. Therefore, the application layer of the server 10 notifies the measurement information (e.g., E2E RTT) to the PDCP layer of the primary cell via the exposure function defined in the mobile network. For example, the application layer of the server 10 sends the measurement information to the NEF/SCEF of the core network (management apparatus 20) via the N33/T8 interface. The AMF/MME in the core network (management apparatus 20) sends the measurement information sent to the NEF/SCEF to the RRC layer of the primary cell. The RRC layer of the primary cell sends the obtained measurement information to the PDCP layer. Then, the PDCP layer of the primary cell sends the obtained measurement information to the MAC layer.

When the plurality of cells is associated with one RLC layer and one MAC layer by carrier aggregation, the base station 30 may aggregate the parameters for each cell group.

In other words, when the plurality of cells is associated with one RLC layer and one MAC layer by carrier aggregation, the base station 30 may acquire the delay time information by regarding a cell group formed by the plurality of cells as one cell.

(S3) Then, the MAC layer of the primary cell performs evaluation regarding the communication delay for each cell based on the monitoring results (delay time information). Then, the MAC layer of the primary cell transfers data in order from the cell assumed to have the smallest delay.

<6-2. Effect>

According to the present embodiment, the base station 30 can realize low-delay communication even when radio waves of the plurality of cells are bundled by carrier aggregation.

7. Modification

The above-described embodiments are examples, and various modifications and applications are possible.

For example, the control device that controls the server 10, the management apparatus 20, the base station 30, and the terminal device 40 of the present embodiments may be realized by a dedicated computer system or may be realized by a general-purpose computer system.

For example, a communication program for executing the above-described operation is stored and distributed in a computer-readable recording medium such as an optical disk, a semiconductor memory, a magnetic tape, or a flexible disk. Then, for example, the program is installed on a computer, and the above-described processes are executed to configure the control device. At this time, the control device may be a device (e.g., personal computer) outside the server 10, the management apparatus 20, the base station 30, and the terminal device 40. Furthermore, the control device may be a device (e.g., control unit 13, control unit 23, control unit 33, and control unit 43) inside the server 10, the management apparatus 20, the base station 30, and the terminal device 40.

In addition, the above communication program may be stored in a disk device included in a server device on a network such as the Internet so that the communication program can be downloaded to the computer. In addition, the above-described functions may be realized by cooperation of an operating system (OS) and application software. In this case, a portion other than the OS may be stored in a medium and distributed, or a portion other than the OS may be stored in a server device and downloaded to the computer.

Among the processes described in the above embodiments, all or part of the processes described as being performed automatically can be performed manually, or all or part of the processes described as being performed manually can be performed automatically by a known method. In addition, the processing procedure, specific name, and information including various data and parameters illustrated in the above document and the drawings can be arbitrarily changed unless otherwise specified. For example, various types of information illustrated in each drawing are not limited to the illustrated information.

In addition, each component of each device illustrated in the drawings is functionally conceptual, and is not necessarily physically configured as illustrated in the drawings. In other words, a specific form of distribution and integration of each device is not limited to the illustrated form, and all or a part thereof can be functionally or physically distributed and integrated in an arbitrary unit according to various loads, usage conditions, and the like. Note that this configuration by distribution and integration may be performed dynamically.

In addition, the above-described embodiments can be appropriately combined in a region in which the processing content do not contradict each other. Furthermore, the order of each step illustrated in the flowchart of the above-described embodiments can be appropriately changed.

Furthermore, for example, the present embodiment can be implemented as any configuration constituting an apparatus or a system, for example, a processor as a system large scale integration (LSI) or the like, a module using a plurality of processors or the like, a unit using a plurality of modules or the like, a set obtained by further adding other functions to a unit, or the like (i.e., configuration of a part of device).

Note that, in the present embodiment, the system means a set of a plurality of components (devices, modules (parts), etc.), and it does not matter whether or not all the components are in the same housing. Therefore, the plurality of devices housed in separate housings and connected via the network and one device in which a plurality of modules is housed in one housing are both systems.

Furthermore, for example, the present embodiments can adopt a configuration of cloud computing in which one function is shared and processed by a plurality of devices in cooperation via a network.

8. Conclusion

As described above, according to the present embodiments, the communication system 1 includes the terminal device 40 in which the aggregate of the plurality of cells is set. The terminal device 40 acquires information regarding a transmission delay time for each cell. For example, the terminal device 40 acquires the E2E RTT calculated based on the delay time between the application layers of the upstream transmission as the delay time information. Then, the terminal device 40 starts the upstream transmission from a cell selected, among the plurality of cells, based on the delay time information. For example, the PDCP layer of the terminal device 40 starts the upstream transmission from a cell in which the delay time of the upstream transmission is evaluated to be small based on the E2E RTT information.

As a result, the terminal device 40 according to the present embodiments can realize low delay even when radio waves of the plurality of cells are bundled to perform communication.

Although the embodiments of the present disclosure have been described above, the technical scope of the present disclosure is not limited to the above-described embodiments as it is, and various modifications can be made without departing from the gist of the present disclosure. In addition, the components of different embodiments and modifications may be appropriately combined.

Note that the effects of each embodiment described in the present specification are merely examples and not limited thereto, and other effects may be provided.

The present technology may also have the following configurations.

(1)

A communication apparatus in which an aggregate of a plurality of cells is set, the communication apparatus comprising:

an acquisition unit configured to acquire, for each of the plurality of cells, delay time information of upstream transmission by the communication apparatus; and a communication control unit configured to start the upstream transmission from a cell selected, among the plurality of cells, based on the delay time information, wherein the acquisition unit acquires information regarding a delay time between application layers of the upstream transmission as the delay time information.

(2)

The communication apparatus according to (1), wherein the communication control unit starts the upstream transmission from a cell evaluated to have a small delay time in the upstream transmission based on the delay time information.

(3)

The communication apparatus according to (1) or (2), wherein the aggregate of the plurality of cells includes at least one of dual connectivity and carrier aggregation of the plurality of cells.

(4)

The communication apparatus according to (3), wherein the plurality of cells includes a first cell managed by a first base station and a second cell managed by a second base station.

(5)

The communication apparatus according to any one of (3) to (4), wherein the aggregate of the plurality of cells includes the dual connectivity and the carrier aggregation, and when the plurality of cells is associated with one RLC layer and one MAC layer in the carrier aggregation, the acquisition unit acquires the delay time information by regarding a cell group formed by the plurality of cells as one cell.

(6)

The communication apparatus according to any one of (1) to (5), wherein the information regarding a delay time between the application layers is a round trip time between the application layers.

(7)

The communication apparatus according to (6), wherein when data passes through a same cell in both transmission and response, the acquisition unit records the round trip time as a delay time between the application layers in the same cell.

(8)

The communication apparatus according to (7), wherein when data passes through different cells in transmission and response, the acquisition unit records the round trip time as a delay time between the application layers in a cell used for the transmission.

(9)

The communication apparatus according to (7), wherein when data passes through different cells in transmission and response, the acquisition unit does not record the round trip time as a delay time between the application layers in a cell used for the transmission.

(10)

The communication apparatus according to any one of (6) to (9), wherein the acquisition unit acquires the round trip time and at least one of a PHY parameter, a MAC parameter, and an RLC parameter, and the communication control unit selects a cell to be used for the upstream transmission based on rank information for each cell calculated based on the information acquired.

(11)

The communication apparatus according to (10), wherein the PHY parameter includes at least one of a block error rate for each modulation scheme or coding rate and a total amount of transmission data.

(12)

The communication apparatus according to (10) or (11), wherein the MAC parameter includes at least one of a new uplink allocation interval and a buffer residence time.

(13)

The communication apparatus according to any one of (10) to (12), wherein the RLC parameter includes information on an ACK response time in an acknowledged mode (AM).

(14)

The communication apparatus according to any one of (10) to (13), wherein the rank information is information indicating a cell congestion degree and a communication path status calculated based on the round trip time, a buffer residence time, a new uplink allocation interval, the RLC parameter, and an ACK response time in a MAC layer.

(15)

The communication apparatus according to any one of (1) to (14), wherein the acquisition unit acquires transmission capacity information of each of the plurality of cells in addition to the delay time information, and the communication control unit executes the upstream transmission within a range not exceeding a transmission capacity of the cell selected based on the delay time information.

(16)

The communication apparatus according to (15), wherein the communication control unit, when a data amount of the upstream transmission exceeds the transmission capacity of the cell selected, determines whether a total delay time becomes shorter by waiting for the selected cell to become available for transfer or by using a cell evaluated to have a next smallest delay time, and when it is determined better to wait, continues the upstream transmission by using the cell selected after waiting for the cell selected to become available for transfer.

(17)

The communication apparatus according to any one of (1) to (16), wherein the communication apparatus is a terminal device.

(18)

The communication apparatus according to (17), wherein the application layer serving as a starting point of the upstream transmission is an application layer of an external device connected to the terminal device.

(19)

A communication method executed by a communication apparatus in which an aggregate of a plurality of cells is set, the communication method comprising:

an acquiring step of acquiring, for each of the plurality of cells, delay time information of upstream transmission by the communication apparatus; and a transmission control step of controlling transmission to start the upstream transmission from a cell selected, among the plurality of cells, based on the delay time information, wherein the acquiring step includes acquiring information regarding a delay time between application layers of the upstream transmission as the delay time information.

REFERENCE SIGNS LIST

1 COMMUNICATION SYSTEM
10 SERVER
20 MANAGEMENT APPARATUS
30 BASE STATION
40 TERMINAL DEVICE
11, 21 COMMUNICATION UNIT
31, 41 WIRELESS COMMUNICATION UNIT
12, 22, 32, 42 STORAGE UNIT
13, 23, 33, 43 CONTROL UNIT
44 EXTERNAL COMMUNICATION UNIT
311, 411 TRANSMISSION PROCESSING UNIT
312, 412 RECEPTION PROCESSING UNIT
313, 413 ANTENNA
431 ACQUISITION UNIT
432 COMMUNICATION CONTROL UNIT

The invention claimed is:

1. A communication apparatus in which an aggregate of a plurality of cells is set, the communication apparatus comprising:

an acquisition unit configured to acquire, for each of the plurality of cells, delay time information of upstream transmission by the communication apparatus; and a communication control unit configured to start the upstream transmission from a cell selected, among the plurality of cells, based on the delay time information, wherein the acquisition unit acquires information regarding a delay time between application layers of the upstream transmission as the delay time information.

2. The communication apparatus according to claim 1, wherein the communication control unit starts the upstream transmission from a cell evaluated to have a small delay time in the upstream transmission based on the delay time information.

3. The communication apparatus according to claim 1, wherein the aggregate of the plurality of cells includes at least one of dual connectivity and carrier aggregation of the plurality of cells.

4. The communication apparatus according to claim 3, wherein the plurality of cells includes a first cell managed by a first base station and a second cell managed by a second base station.

5. The communication apparatus according to claim 3, wherein the aggregate of the plurality of cells includes the dual connectivity and the carrier aggregation, and when the plurality of cells is associated with one RLC layer and one MAC layer in the carrier aggregation, the acquisition unit acquires the delay time information by regarding a cell group formed by the plurality of cells as one cell.

6. The communication apparatus according to claim 1, wherein the information regarding a delay time between the application layers is a round trip time between the application layers.

7. The communication apparatus according to claim 6, wherein when data passes through a same cell in both transmission and response, the acquisition unit records the round trip time as a delay time between the application layers in the same cell.

8. The communication apparatus according to claim 7, wherein when data passes through different cells in transmission and response, the acquisition unit records the round trip time as a delay time between the application layers in a cell used for the transmission.

9. The communication apparatus according to claim 7, wherein when data passes through different cells in transmission and response, the acquisition unit does not record the round trip time as a delay time between the application layers in a cell used for the transmission.

10. The communication apparatus according to claim 6, wherein the acquisition unit acquires the round trip time and at least one of a PHY parameter, a MAC parameter, and an RLC parameter, and the communication control unit selects a cell to be used for the upstream transmission based on rank information for each cell calculated based on the information acquired.

11. The communication apparatus according to claim 10, wherein the PHY parameter includes at least one of a block error rate for each modulation scheme or coding rate and a total amount of transmission data.

12. The communication apparatus according to claim 10, wherein the MAC parameter includes at least one of a new uplink allocation interval and a buffer residence time.

13. The communication apparatus according to claim 10, wherein the RLC parameter includes information on an ACK response time in an acknowledged mode (AM).

14. The communication apparatus according to claim 10, wherein the rank information is information indicating a cell congestion degree and a communication path status calculated based on the round trip time, a buffer residence time, a new uplink allocation interval, the RLC parameter, and an ACK response time in a MAC layer.

15. The communication apparatus according to claim 1, wherein the acquisition unit acquires transmission capacity information of each of the plurality of cells in addition to the delay time information, and the communication control unit executes the upstream transmission within a range not exceeding a transmission capacity of the cell selected based on the delay time information.

16. The communication apparatus according to claim 15, wherein the communication control unit, when a data amount of the upstream transmission exceeds the transmission capacity of the cell selected, determines whether a total delay time becomes shorter by waiting for the selected cell to become available for transfer or by using a cell evaluated to have a next smallest delay time, and when it is determined better to wait, continues the upstream transmission by using the cell selected after waiting for the cell selected to become available for transfer.

17. The communication apparatus according to claim 1, wherein the communication apparatus is a terminal device.

18. The communication apparatus according to claim 17, wherein the application layer serving as a starting point of the upstream transmission is an application layer of an external device connected to the terminal device.

19. A communication method executed by a communication apparatus in which an aggregate of a plurality of cells is set, the communication method comprising:

an acquiring step of acquiring, for each of the plurality of cells, delay time information of upstream transmission by the communication apparatus; and a transmission control step of controlling transmission to start the upstream transmission from a cell selected, among the plurality of cells, based on the delay time information, wherein the acquiring step includes acquiring information regarding a delay time between application layers of the upstream transmission as the delay time information.

* * * * *